(12) United States Patent
Zheng et al.

(10) Patent No.: US 12,360,429 B2
(45) Date of Patent: Jul. 15, 2025

(54) ELECTROPHORETIC DISPLAY DEVICE

(71) Applicant: E INK CORPORATION, Billerica, MA (US)

(72) Inventors: Xiaolong Zheng, Fremont, CA (US); Craig Lin, Fremont, CA (US)

(73) Assignee: E Ink Corporation, Billerica, MA (US)

( * ) Notice: Subject to any disclaimer, the term of this patent is extended or adjusted under 35 U.S.C. 154(b) by 160 days.

(21) Appl. No.: 18/374,439

(22) Filed: Sep. 28, 2023

(65) Prior Publication Data
US 2024/0019752 A1 Jan. 18, 2024

Related U.S. Application Data

(63) Continuation of application No. 17/339,216, filed on Jun. 4, 2021, now Pat. No. 11,868,020.
(Continued)

(51) Int. Cl.
*G02F 1/16757* (2019.01)
*G02F 1/167* (2019.01)
(Continued)

(52) U.S. Cl.
CPC .......... *G02F 1/16757* (2019.01); *G02F 1/167* (2013.01); *G02F 1/1677* (2019.01);
(Continued)

(58) Field of Classification Search
CPC ............. G02F 1/167; G02F 2001/1678; G02F 1/1685; G02F 1/16757; G02F 2203/34;
(Continued)

(56) References Cited

U.S. PATENT DOCUMENTS

| 6,017,584 A | 1/2000 | Albert et al. |
| 6,067,134 A | 5/2000 | Akiyama et al. |

(Continued)

FOREIGN PATENT DOCUMENTS

| CN | 110010080 A | 7/2019 |
| CN | 112017599 A | 12/2020 |

(Continued)

OTHER PUBLICATIONS

European Patent Office, "Extended European Search Report", EP Appl. No. 21817559.4, May 17, 2024. May 17, 2024.
(Continued)

*Primary Examiner* — Brandi N Thomas
(74) *Attorney, Agent, or Firm* — Rajesh Vallabh

(57) ABSTRACT

An electrophoretic medium comprises a fluid and first, second, third and fourth types of particles (W, Y, R, B) having four different colors. The first and third particles have charges of one polarity and the second and fourth particles charges of the opposite polarity; the first particles have a greater zeta potential or electrophoretic mobility than the third particles, and the second particles a greater zeta potential or electrophoretic mobility than the fourth particles. One particle is white (W), one non-white particle (R) is partially light-transmissive, and the remaining two non-white particles (B, Y) are light-reflective. A third light-reflective particle (G) may be added to create a five particle medium.

4 Claims, 29 Drawing Sheets

Related U.S. Application Data

(60) Provisional application No. 63/035,086, filed on Jun. 5, 2020.

(51) Int. Cl.
*G02F 1/1677* (2019.01)
*G02F 1/1685* (2019.01)
*G09G 3/20* (2006.01)
*G09G 3/34* (2006.01)

(52) U.S. Cl.
CPC ......... *G02F 1/1685* (2019.01); *G09G 3/2003* (2013.01); *G09G 3/344* (2013.01)

(58) Field of Classification Search
CPC ............. G02F 1/1676; G02F 2201/123; G02F 1/0018; G02B 26/023; G02B 5/136; G02B 5/201; G02B 6/005
See application file for complete search history.

(56) References Cited

U.S. PATENT DOCUMENTS

| | | |
|---|---|---|
| 6,504,524 B1 | 1/2003 | Gates et al. |
| 6,531,997 B1 | 3/2003 | Gates et al. |
| 6,545,797 B2 | 4/2003 | Chen et al. |
| 6,607,134 B1 | 8/2003 | Bard et al. |
| 6,620,466 B2 | 9/2003 | Nakamura et al. |
| 6,664,944 B1 | 12/2003 | Albert et al. |
| 6,788,452 B2 | 9/2004 | Liang et al. |
| 6,825,829 B1 | 11/2004 | Albert et al. |
| 6,864,875 B2 | 3/2005 | Drzaic et al. |
| 6,866,760 B2 | 3/2005 | Paolini, Jr. et al. |
| 6,914,714 B2 | 7/2005 | Chen et al. |
| 6,922,276 B2 | 7/2005 | Zhang et al. |
| 6,930,818 B1 | 8/2005 | Liang et al. |
| 6,972,893 B2 | 12/2005 | Chen et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,072,095 B2 | 7/2006 | Liang et al. |
| 7,075,502 B1 | 7/2006 | Drzaic et al. |
| 7,112,114 B2 | 9/2006 | Liang et al. |
| 7,116,318 B2 | 10/2006 | Amundson et al. |
| 7,144,942 B2 | 12/2006 | Zang et al. |
| 7,158,282 B2 | 1/2007 | Liang et al. |
| 7,167,155 B1 | 1/2007 | Albert et al. |
| 7,236,292 B2 | 6/2007 | LeCain |
| 7,312,784 B2 | 12/2007 | Baucom et al. |
| 7,385,751 B2 | 6/2008 | Chen et al. |
| 7,411,719 B2 | 8/2008 | Paolini, Jr. et al. |
| 7,443,571 B2 | 10/2008 | LeCain et al. |
| 7,453,445 B2 | 11/2008 | Amundson |
| 7,492,505 B2 | 2/2009 | Liang et al. |
| 7,513,813 B2 | 4/2009 | Paolini, Jr. et al. |
| 7,535,624 B2 | 5/2009 | Amundson et al. |
| 7,561,324 B2 | 7/2009 | Duthaler et al. |
| 7,636,191 B2 | 12/2009 | Duthaler et al. |
| 7,649,666 B2 | 1/2010 | Isobe et al. |
| 7,667,684 B2 | 2/2010 | Jacobson et al. |
| 7,679,814 B2 | 3/2010 | Paolini, Jr. et al. |
| 7,684,108 B2 | 3/2010 | Wang et al. |
| 7,715,088 B2 | 5/2010 | Liang et al. |
| 7,728,811 B2 | 6/2010 | Albert et al. |
| 7,729,039 B2 | 6/2010 | LeCain et al. |
| 7,733,554 B2 | 6/2010 | Danner et al. |
| 7,791,782 B2 | 9/2010 | Paolini, Jr. et al. |
| 7,791,789 B2 | 9/2010 | Albert et al. |
| 7,800,813 B2 | 9/2010 | Wu et al. |
| 7,821,702 B2 | 10/2010 | Liang et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,910,175 B2 | 3/2011 | Webber |
| 7,952,790 B2 | 5/2011 | Honeyman et al. |
| 7,956,841 B2 | 6/2011 | Albert et al. |
| 7,982,941 B2 | 7/2011 | Lin et al. |
| 8,009,348 B2 | 8/2011 | Zehner et al. |
| 8,034,209 B2 | 10/2011 | Danner et al. |
| 8,040,594 B2 | 10/2011 | Paolini, Jr. et al. |
| 8,054,526 B2 | 11/2011 | Bouchard |
| 8,068,272 B2 | 11/2011 | LeCain et al. |
| 8,077,381 B2 | 12/2011 | LeCain et al. |
| 8,098,418 B2 | 1/2012 | Paolini, Jr. et al. |
| 8,159,636 B2 | 4/2012 | Sun et al. |
| 8,177,942 B2 | 5/2012 | Paolini, Jr. et al. |
| 8,213,076 B2 | 7/2012 | Albert et al. |
| 8,363,299 B2 | 1/2013 | Paolini, Jr. et al. |
| 8,390,301 B2 | 3/2013 | Danner et al. |
| 8,422,116 B2 | 4/2013 | Sprague et al. |
| 8,441,714 B2 | 5/2013 | Paolini, Jr. et al. |
| 8,441,716 B2 | 5/2013 | Paolini, Jr. et al. |
| 8,466,852 B2 | 6/2013 | Drzaic et al. |
| 8,482,835 B2 | 7/2013 | LeCain |
| 8,503,063 B2 | 8/2013 | Sprague |
| 8,576,470 B2 | 11/2013 | Paolini, Jr. et al. |
| 8,576,475 B2 | 11/2013 | Huang et al. |
| 8,593,721 B2 | 11/2013 | Albert et al. |
| 8,605,354 B2 | 12/2013 | Zhang et al. |
| 8,649,084 B2 | 2/2014 | Wang et al. |
| 8,670,174 B2 | 3/2014 | Sprague et al. |
| 8,687,265 B2 | 4/2014 | Ahn |
| 8,704,756 B2 | 4/2014 | Lin |
| 8,717,664 B2 | 5/2014 | Wang et al. |
| 8,786,929 B2 | 7/2014 | LeCain |
| 8,786,935 B2 | 7/2014 | Sprague |
| 8,797,634 B2 | 8/2014 | Paolini, Jr. et al. |
| 8,810,899 B2 | 8/2014 | Sprague et al. |
| 8,830,553 B2 | 9/2014 | Patry et al. |
| 8,830,559 B2 | 9/2014 | Honeyman et al. |
| 8,854,721 B2 | 10/2014 | Danner et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,964,282 B2 | 2/2015 | Wang et al. |
| 9,013,783 B2 | 4/2015 | Sprague |
| 9,075,280 B2 | 7/2015 | Whitesides |
| 9,116,412 B2 | 8/2015 | Lin |
| 9,146,439 B2 | 9/2015 | Zhang |
| 9,164,207 B2 | 10/2015 | Honeyman et al. |
| 9,170,467 B2 | 10/2015 | Whitesides et al. |
| 9,170,468 B2 | 10/2015 | Lin et al. |
| 9,176,358 B2 | 11/2015 | Fujimori et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,238,340 B2 | 1/2016 | Kayal et al. |
| 9,268,191 B2 | 2/2016 | Paolini, Jr. et al. |
| 9,279,906 B2 | 3/2016 | Kang |
| 9,285,649 B2 | 3/2016 | Du et al. |
| 9,293,511 B2 | 3/2016 | Jacobson et al. |
| 9,341,916 B2 | 5/2016 | Telfer et al. |
| 9,360,733 B2 | 6/2016 | Wang et al. |
| 9,361,836 B1 | 6/2016 | Telfer et al. |
| 9,383,623 B2 | 7/2016 | Lin et al. |
| 9,423,666 B2 | 8/2016 | Wang et al. |
| 9,436,056 B2 | 9/2016 | Paolini, Jr. et al. |
| 9,459,510 B2 | 10/2016 | Lin |
| 9,470,950 B2 | 10/2016 | Paolini, Jr. et al. |
| 9,513,527 B2 | 12/2016 | Chan et al. |
| 9,541,814 B2 | 1/2017 | Lin et al. |
| 9,552,780 B2 | 1/2017 | Telfer et al. |
| 9,554,495 B2 | 1/2017 | Danner et al. |
| 9,563,099 B2 | 2/2017 | LeCain et al. |
| 9,640,119 B2 | 5/2017 | Lin et al. |
| 9,646,547 B2 | 5/2017 | Lin et al. |
| 9,671,668 B2 | 6/2017 | Chan et al. |
| 9,697,778 B2 | 7/2017 | Telfer et al. |

(56) References Cited

U.S. PATENT DOCUMENTS

| | | |
|---|---|---|
| 9,726,959 B2 | 8/2017 | Whitesides et al. |
| 9,733,540 B2 | 8/2017 | LeCain et al. |
| 9,740,076 B2 | 8/2017 | Paolini et al. |
| 9,759,980 B2 | 9/2017 | Du et al. |
| 9,759,981 B2 | 9/2017 | Wang et al. |
| 9,761,181 B2 | 9/2017 | Chan et al. |
| 9,778,536 B2 | 10/2017 | LeCain et al. |
| 9,778,538 B2 | 10/2017 | Telfer et al. |
| 9,779,670 B2 | 10/2017 | Uesaka et al. |
| 9,779,671 B2 | 10/2017 | Gan et al. |
| 9,812,073 B2 | 11/2017 | Lin et al. |
| 9,829,764 B2 | 11/2017 | Paolini, Jr. et al. |
| 9,835,925 B1 | 12/2017 | Bull et al. |
| 9,921,451 B2 | 3/2018 | Telfer et al. |
| 9,922,603 B2 | 3/2018 | Lin |
| 9,989,829 B2 | 6/2018 | Telfer et al. |
| 10,032,419 B2 | 7/2018 | Lin et al. |
| 10,036,929 B2 | 7/2018 | Du et al. |
| 10,036,931 B2 | 7/2018 | Chan et al. |
| 10,147,366 B2 | 12/2018 | Lin et al. |
| 10,162,242 B2 | 12/2018 | Wang et al. |
| 10,209,556 B2 | 2/2019 | Rosenfeld et al. |
| 10,234,742 B2 | 3/2019 | Chan |
| 10,332,435 B2 | 6/2019 | Wang et al. |
| 10,339,876 B2 | 7/2019 | Lin et al. |
| 10,353,266 B2 | 7/2019 | Bouchard et al. |
| 10,366,647 B2 | 7/2019 | Szymborski |
| 10,372,010 B2 | 8/2019 | Du et al. |
| 10,380,931 B2 | 8/2019 | Lin et al. |
| 10,380,955 B2 | 8/2019 | Lin |
| 10,431,168 B2 | 10/2019 | Lin et al. |
| 10,444,591 B2 | 10/2019 | Honeyman et al. |
| 10,444,592 B2 | 10/2019 | Bouchard |
| 10,466,564 B2 | 11/2019 | Kayal et al. |
| 10,467,984 B2 | 11/2019 | Buckley et al. |
| 10,475,399 B2 | 11/2019 | Telfer et al. |
| 10,509,293 B2 | 12/2019 | Telfer et al. |
| 10,514,583 B2 | 12/2019 | Zhang |
| 10,586,499 B2 | 3/2020 | Lin et al. |
| 10,591,800 B2 | 3/2020 | Chiu et al. |
| 10,679,571 B2 | 6/2020 | Chiu et al. |
| 10,782,586 B2 | 9/2020 | Liu et al. |
| 10,891,906 B2 | 1/2021 | Lin |
| 11,151,951 B2 | 10/2021 | Lin et al. |
| 11,500,261 B2 | 11/2022 | Wu et al. |
| 2007/0237962 A1 | 10/2007 | Liang et al. |
| 2008/0043318 A1 | 2/2008 | Whitesides et al. |
| 2008/0048970 A1 | 2/2008 | Drzaic et al. |
| 2009/0168067 A1 | 7/2009 | LeCain et al. |
| 2009/0225398 A1 | 9/2009 | Duthaler et al. |
| 2010/0156780 A1 | 6/2010 | Jacobson et al. |
| 2011/0043543 A1 | 2/2011 | Chen et al. |
| 2011/0164301 A1 | 7/2011 | Paolini, Jr. et al. |
| 2012/0326957 A1 | 12/2012 | Drzaic et al. |
| 2013/0242378 A1 | 9/2013 | Paolini, Jr. et al. |
| 2013/0278995 A1 | 10/2013 | Drzaic et al. |
| 2014/0055840 A1 | 2/2014 | Zang et al. |
| 2014/0078576 A1 | 3/2014 | Sprague |
| 2015/0118390 A1 | 4/2015 | Rosenfeld et al. |
| 2015/0268531 A1 | 9/2015 | Wang et al. |
| 2015/0301246 A1 | 10/2015 | Zang et al. |
| 2016/0048054 A1 | 2/2016 | Danner |
| 2018/0321568 A1 | 11/2018 | Moriwaki |
| 2021/0382369 A1 | 12/2021 | Zheng et al. |
| 2022/0215806 A1* | 7/2022 | Lin ................ G09G 3/2003 |

FOREIGN PATENT DOCUMENTS

| | | |
|---|---|---|
| JP | 2010044114 A | 2/2010 |
| JP | 2013250404 A | 9/2013 |
| WO | 2012047000 A2 | 4/2012 |

OTHER PUBLICATIONS

Korean Intellectual Property Office, "International Search Report and Written Opinion", PCT/US2021/035890, Sep. 27, 2021. Sep. 27, 2021.

* cited by examiner

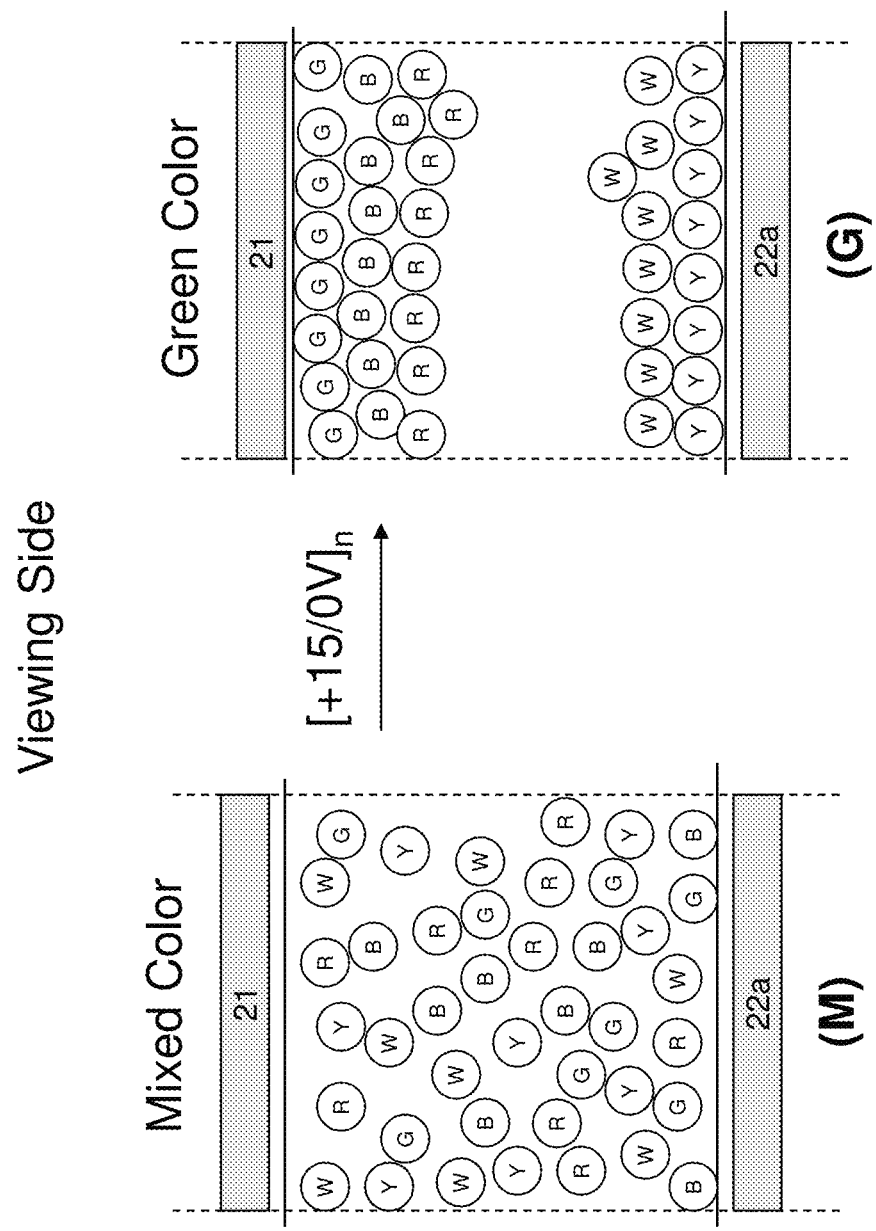

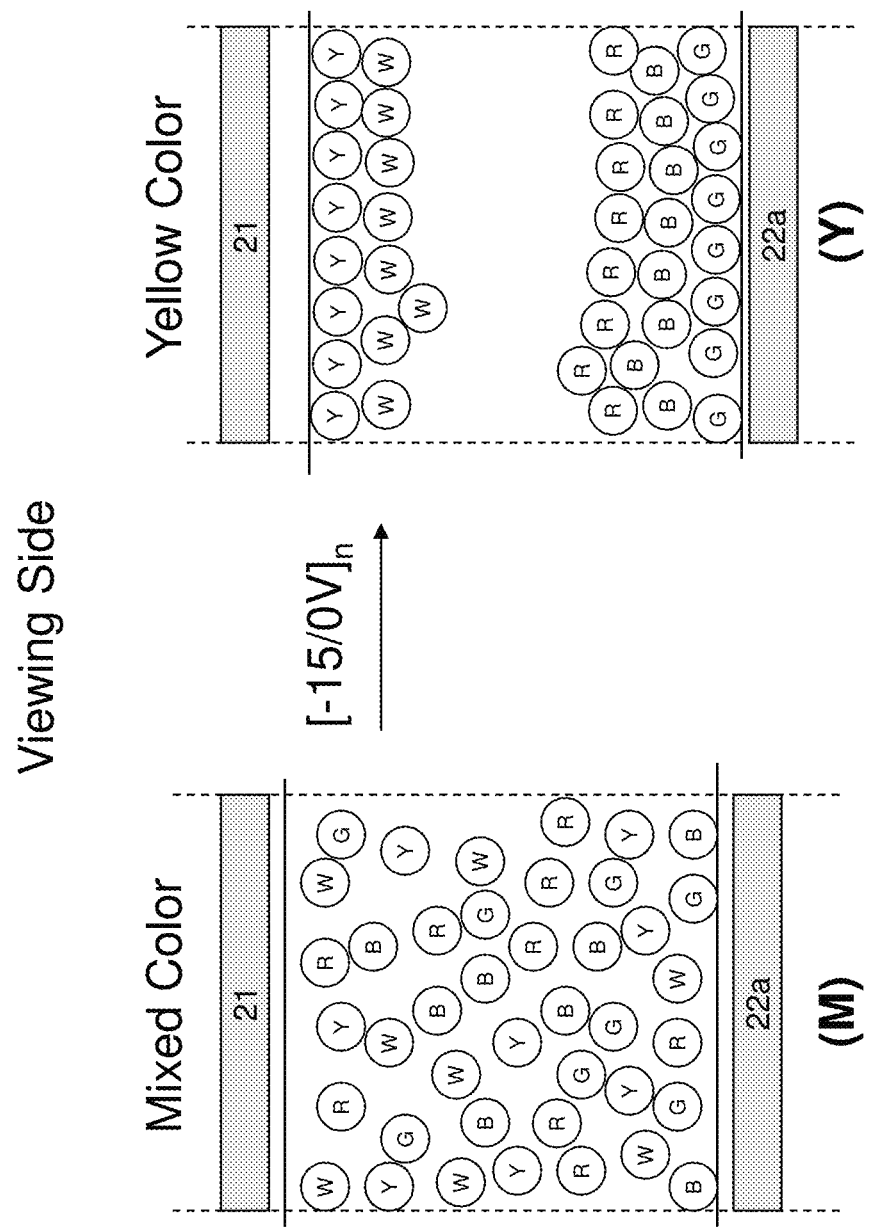

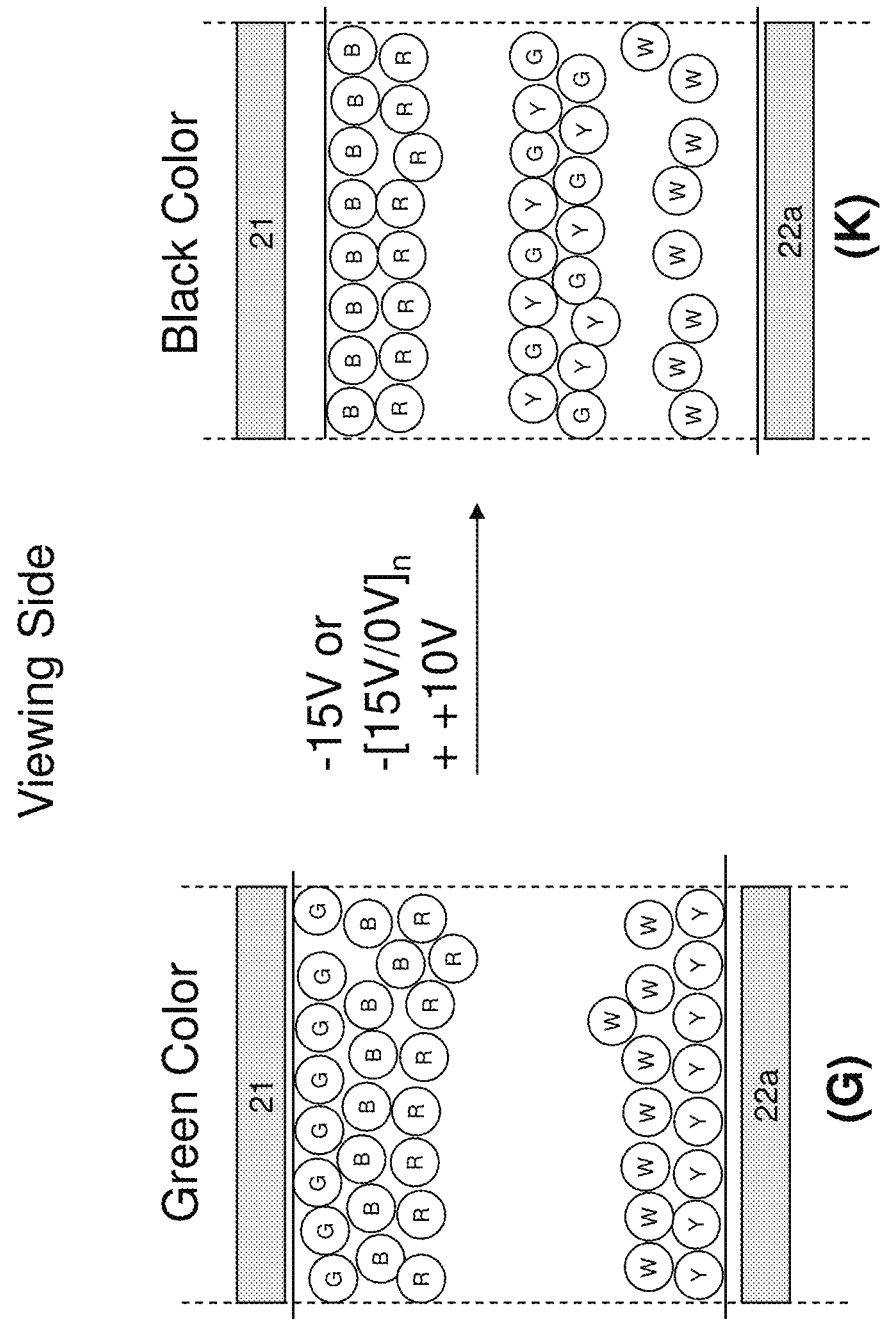

ELECTROPHORETIC DISPLAY DEVICE

REFERENCE TO RELATED APPLICATIONS

This application is a continuation of U.S. patent application Ser. No. 17/339,216 (published as US2021-0382369), filed Jun. 4, 2021, which claims benefit of provisional Application Ser. No. 63/035,086, filed Jun. 5, 2020, which applications are hereby incorporated by reference.

This application is related to U.S. Pat. Nos. 9,170,468; 9,361,836; 9,513,527; 9,541,814; 9,640,119; 9,812,073; 9,922,603; 10,147,366; 10,234,742; 10,431,168; 10,509,293; 10,586,499; and 10,782,586.

The entire contents of the aforementioned provisional application and patents, and of all other U.S. patents and published and copending applications mentioned below, are herein incorporated by reference.

BACKGROUND OF INVENTION

The aforementioned patents and published applications describe electrophoretic media, methods for driving such media, and electrophoretic display devices incorporating such media. The electrophoretic media comprise a fluid and first, second, third and fourth types of particles dispersed in the fluid; such media may hereinafter be referred to a "four particle electrophoretic media". In some cases, the media also comprise a fifth type of particles. The four or five types of particles have optical characteristics (typically colors) differing from each other. The first type of particles carry a high positive charge and the second type of particles carry a high negative charge. The third type of particles carry a low positive charge and the fourth type of particles carry a low negative charge. (The charge intensity is measured in terms of zeta potential.) The fifth type of particles carry an intermediate charge of either polarity. In the electrophoretic display device, the electrophoretic medium is disposed between a front electrode and a rear electrode, with the display normally being viewed from the front electrode (viewing) side. In a typical multi-pixel display, the front electrode is continuous, extending across multiple pixels and typically the entire display, while a separate rear electrode is provided for each pixel to enable the displayed color to be controlled on a pixel-by-pixel basis.

The optical characteristics of the first and second types of particles can (in principle) be displayed at the viewing side by applying a high electric field of appropriate polarity across the electrophoretic medium for a period sufficient to enable the first or second types of particles to lie adjacent the front electrode. To display the optical characteristic of the third type of particles, the second type of particles is first driven to the viewing surface by applying a high electric field of appropriate polarity, and then a low electric field of opposite polarity is applied to cause the third type of particles to lie adjacent the viewing surface while the first, second and fourth types of particles are spaced from this surface. (Note that the second part of this sequence involves a change from the optical characteristic of a high negative particle (the second type of particle) to the optical characteristic of a low positive particle (the third type of particle). Similarly, to display the optical characteristic of the fourth type of particles, the first type of particles is first driven to the viewing surface by applying a high electric field of appropriate polarity, and then a low electric field of opposite polarity is applied to cause the fourth type of particles to lie adjacent the viewing surface while the first, second and third types of particles are spaced from this surface. (Again, note that the second part of this sequence involves a change from the optical characteristic of a high positive particle (the first type of particle) to the optical characteristic of a low negative particle (the fourth type of particle). To display the color of the intermediate charged particles, the low charged particles of opposite polarity to the intermediate charged particles are first driven to the viewing surface and then an intermediate electric field having a polarity driving the intermediate charged particles towards the viewing surface is applied. (Again, the last step involves a change from the optical characteristic of one low charged particle to the optical characteristic of the intermediate charged particle of the opposite polarity.) In practice, to achieve optimum separations of the various types of particles, the waveforms (sequences of drive pulses) may be considerably more complicated than the preceding simple summary would suggest, and may include any one or more of (a) repetitions of the one or two basic drive pulses already described; (b) periods of zero voltage between drive pulses; (c) the use of shaking pulses (rapidly alternating positive and negative pulses) intended to mix the various types of particles uniformly; and (d) direct current (DC) balancing pulses intended to render the overall impulse of the waveform zero or close to zero (it being known that repeated application on DC-imbalanced waveforms to electrophoretic displays may eventually cause damage to the displays which may reduce the quality of the displayed images and may ultimately cause the display to fail completely). As to all the preceding waveform features, see for example the aforementioned U.S. Pat. No. 9,640,119.

Although in most cases it is not stated explicitly, four and five particle electrophoretic media use light-scattering ("reflecting") particles, not light-transmissive particles, so that the color (or other optical characteristic) seen at the viewing side is determined only by the color of the particles immediately adjacent the front electrode, the relative positions of the other particles being irrelevant. Accordingly, such electrophoretic media display only four or five independent optical states, although they may also display a "particle mixture" state (typically grayish), in which the various types of particles are mixed at random, and other mixed states in which two types of particles lie adjacent the viewing side; for example, an orange color may be produced by mixing red and yellow particles adjacent the viewing surface.

This limitation of four particle electrophoretic media to four independent optical states is a serious practical disadvantage because in many applications, for example electronic signs such as electronic shelf labels, it is desirable to be able to display black, white and three primary colors, for example red, green and blue or blue, red and yellow. Good black and white states are important for text, while three primary colors allow for full color display by dithering. Hitherto, four particle electrophoretic media have typically either had good black and white with two "highlight" colors (usually red and yellow) or had white and three primary colors, relying upon mixtures of the three primary colors to produce a (frequently unsatisfactory) "process" black.

It is known to overcome the aforementioned disadvantage of four particle electrophoretic media by incorporating a fifth, and optionally a sixth, type of particles into the electrophoretic medium; see, for example, U.S. Pat. Nos. 9,541,814 and 9,922,603. However, increasing the number of types of particles in the electrophoretic medium renders it more difficult to choose appropriate particles because of the increased need for tight control over the charges on the various particles, the increased possibilities for interactions between the various particles (which may result in increased color contamination), and lengthened waveforms; the five and six particle electrophoretic media described in U.S. Pat. Nos. 9,541,814 and 9,922,603 require at least one three-step waveform; to display the color of an intermediate charged particle of one polarity, it is first necessary to display the color of the highly charged particle of the one polarity, then the color of the low charged particle of the opposite polarity and finally the color of the intermediate charged particles of the one polarity.

The present inventors have now found that a four particle electrophoretic medium can be made to display five separate optical states by choosing one of the type of particles to be partially light-transmitting. A fifth particle may be added to allow for display of six optical states, for example black, white, red, green, blue and yellow. (In practice, such a sixth optical state is desirable because typically a black/white/red/green/blue system does not provide a good saturated yellow, while a black/white/blue/red/yellow system does not provide a good saturated green.)

SUMMARY OF INVENTION

Accordingly, this invention provides an electrophoretic medium comprising a fluid and first, second, third and fourth types of particles dispersed in the fluid, the first, second, third and fourth types of particles having respectively first, second, third and fourth colors differing from one another, the first and third types of particles having charges of one polarity and the second and fourth types of particles having charges of the opposite polarity, the first type of particles having a greater zeta potential or electrophoretic mobility than the third type of particles, and the second type of particles having a greater zeta potential or electrophoretic mobility than the fourth type of particles, wherein one of the types of particles is white, one of the types of non-white particles is partially light-transmissive, and the remaining two types of non-white particles are light-reflective. The electrophoretic medium may further comprise a fifth type of charged particle having a fifth color differing from all of the first, second, third and fourth colors. In some embodiments, the fifth type of particle is light-reflective and bears a charge of the same polarity as the partially light-transmissive type of particle. In some embodiments, the fifth type of particle has a greater zeta potential or electrophoretic mobility than the other two types of particles bearing charges of the same polarity.

In some embodiments of the present invention, the white type of particles are the third or fourth type of particles, i.e., are one of the low charged types of particles. Also, where the white particles are one of the low charged types of particles, the partially light-transmissive type of particles may be the highly charged (or the intermediate charged, if five charged particles are present) type of particles of the opposite polarity to the white particles. In this case, it is advantageous for the (or one of the, in five particle systems) light-reflective type of particle bearing the same charge as the partially light-transmissive type of particle to have optical characteristics such that a mixture of the two types of particles absorbs substantially all visible radiation, i.e., provides a process black.

In the electrophoretic medium of the invention, the fourth particle may be white, the second particle may be yellow in color, and the first and third particles may be red and blue (in either order), although for reasons discussed below with reference to FIGS. 6A-6F, it may be advantageous for the first particles to be red and partially light-transmissive. The fifth particle, if present, may be, for example, green, cyan or magenta, although green is generally preferred for reasons discussed above.

The four particle electrophoretic medium of the invention can display at least five colors (not counting the fully mixed state in which all four types of particles are randomly mixed. The colors of the white particles and the two light-reflective types of particles can be displayed simply by bringing each type of particles adjacent the viewing surface. The color of the partially light-transmissive type of particles can be displayed by bringing a mixture of this type of particles and the white particles adjacent the viewing surface, so that light entering through the viewing surface undergoes scattering by the white particles and passage through the partially light-transmissive particles, eventually re-emerging from the viewing surface with the color of the light-transmissive type of particles. (See the discussion below with reference to FIG. 3A regarding the practical details of this color formation.) The fifth color displayed is a process black, which is displayed by bringing the light-transmissive particles adjacent the viewing surface, with the reflective particles bearing charges of the same polarity immediately behind (i.e., immediately on the opposed side of the light-transmissive particles from the viewing surface) so that light entering through the viewing surface passes through the light-transmissive type of particles, and is then essentially totally absorbed by the reflective type of particles immediately behind the light-transmissive particles. Obviously, for this process black to be satisfactory, it is necessary that the combined absorption by the two types of particles extend across the whole visible spectrum, which is why it is preferred that the two types of particles be red and blue (in either order), since it is relatively easy to arrange that red and blue particles together absorb all visible light. An example of absorption spectra for red and blue pigments capable of producing an excellent process black is given below. Some four particle electrophoretic media of the invention can usefully display a sixth color by bringing a mixture of the two non-white light-reflective types of particles adjacent the viewing surface; when these two types of particles are yellow and blue, this produces a green color. The five particle media of the invention can display six colors, the additional color being that of the third non-white reflective particle.

As already indicated, in the electrophoretic media of the invention, one type of particles is white, another type is partially light-transmissive, while the remaining two or three types of particles are light-reflective (i.e., light scattering). In practice, of course, there no such thing as a completely light-scattering particle or a completely non-light-scattering, light-transmissive particle, and the minimum degree of light scattering of the light-scattering particles, and the maximum tolerable degree of light scattering tolerable in the light-transmissive particles, may vary somewhat depending upon factors such as the exact pigments used, their refractive index and size, their colors, the thickness of the particle layer in question (which is itself dependent upon the thickness of the electrophoretic medium layer and the loading of each type of particle in that medium) and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment.

The light-transmissivity of pigments is most conveniently measured by contrast ratio, which (for purposes of the present application) is defined as the ratio of luminous reflectance of a specimen backed with black material of a specified reflectance (Rb) to reflectance of the same specimen backed with white material of specified reflectance (Rw):

$CR=Rb/Rw$

Contrast ratio (CR) is an indicator of opacity, and will of course vary with the thickness of the layer of pigment present in the electrophoretic medium as well as the type of pigment used. Generally at CR=0.98, you get full opacity. The hiding power of paint is understood to be its ability to eliminate the contrast between a black and a white substrate to the extent that the reflectance obtained over a black substrate is 98% of that obtained over a white substrate. The layer of light-transmissive pigment used in the present electrophoretic medium should have a contrast ratio of not more than about 0.5, and preferably not more than about 0.3. The blue pigment used in the experiments described below has a contrast ratio of about 0.2 The reflective pigments should have contrast ratios not less than about 0.6, and preferably not less than about 0.7.

The electrophoretic medium of the invention may be encapsulated or unencapsulated. If encapsulated, the electrophoretic medium may be contained within a plurality of microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. Alternatively, the electrophoretic medium may be encapsulated in capsules, or may be in the form of a so-called polymer-dispersed electrophoretic medium comprising a plurality of discrete droplets of the electrophoretic fluid and a continuous phase of a polymeric material; the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760.

The present invention extends to an electrophoretic display device comprising a layer of an electrophoretic medium of the invention, a front and a rear electrode disposed on opposed sides of the layer of electrophoretic medium, and voltage control means arranged to control the potentials of the front and rear electrodes. The present invention also extends to a front plane laminate, inverted front plane laminate or double release film containing a layer of an electrophoretic medium of the invention; see below for the definitions of front plane laminate, inverted front plane laminate and double release film.

The present invention also extends to methods for driving an electrophoretic display device of the invention. A first driving method comprises:
(i) applying a first driving voltage having a polarity driving the partially light-transmissive type of particles and the light-reflective particles bearing charges of the same polarity as the partially light-transmissive type of particles towards the viewing surface for a first period of time;
(ii) after step (i), applying no driving voltage a second period of time longer than the first period of time;
(iii) repeating steps (i) and (ii), thereby causing the color of a mixture of the two types of particles (preferably a black color) to be displayed at the viewing surface.

A second driving method comprises:
(i) applying a second driving voltage having a polarity driving partially light-transmissive type of particles towards the viewing surface for a third period of time;
(ii) applying a third driving voltage have a polarity opposite to that of the second driving voltage and a magnitude less than that of the second driving voltage for a fourth period of time longer than the third period of time;
(iii) repeating steps (i) and (ii);
(iv) after the repetition of steps (i) and (ii), applying the third driving voltage for a fifth period of time;
(v) applying no driving voltage for a sixth period of time;
(vi) repeating steps (iv) and (iv);
(vii) after the repetition of steps (iv) and (v), applying the second driving voltage for a seventh period of time;
(viii) applying a fourth driving voltage having the same polarity as, but a smaller magnitude than, the third driving voltage for an eighth period of time longer than the seventh period of time; and
(ix) repeating steps (vii) and (viii), but concluding with a repetition of step (vii) not followed by a repetition of step (viii), thereby displaying the color of the light-transmissive type of particles at the viewing surface.

In this second driving method, a period of zero voltage may be inserted between each step (i) and the subsequent step (ii) and/or between each step (vii) and the subsequent step (viii).

A third driving method of the invention comprises:
(i) applying a fifth driving voltage having a polarity driving the two types of particles of one polarity towards the viewing surface for a ninth period of time;
(ii) applying a sixth driving voltage have a polarity opposite to that of the fifth driving voltage and a magnitude less than that of the fifth driving voltage for a tenth period of time longer than the ninth period of time;
(iii) repeating steps (i) and (ii); and
(iv) after the repetition of steps (i) and (ii) applying a sixth driving voltage having the same polarity as the fourth driving voltage, the magnitude and/or time of application of the sixth driving voltage not being sufficient to drive the display to display the color of the second type of particles at the viewing surface, thereby displaying the color of a mixture of two non-white light reflective particles at the viewing surface.

In this third driving method, a period of zero voltage may be inserted between each step (i) and the subsequent step (ii).

Each of the driving methods of the invention may be preceded by one or more periods of shaking waveform and/or one or more periods of DC balancing waveform (i.e., periods in which a non-zero voltage is applied to the display so as to reduce or eliminate the overall impulse of the total waveform applied.

In any of the driving methods of the invention, when a sequence of drive pulses is repeated, that repetition may be for a least 4, and preferably at least 8, times.

BRIEF DESCRIPTION OF DRAWINGS

FIGS. 7A-7F are schematic cross-sections similar to those of FIGS. 3A-3F but showing various optical transitions which a five particle display device of the present invention can undergo.

DETAILED DESCRIPTION

As indicated above, in one aspect the present invention provides a four particle electrophoretic medium can be made to display five separate optical states. The electrophoretic medium comprises a fluid and first, second, third and fourth types of particles dispersed in the fluid; all four types of particles have different colors. The first and third types of particles bear charges of one polarity and the second and fourth types of particles bear charges of the opposite polarity. The first type of particles have a greater zeta potential or electrophoretic mobility than the third type of particles, and the second type of particles have a greater zeta potential or electrophoretic mobility than the fourth type of particles. (Thus, in the two pairs of oppositely charged particles, one pair carries a stronger charge than the other pair. Therefore, the four types of particles may also be referred to as high positive particles, high negative particles, low positive particles and low negative particles.) One type of particles is white. One of the non-white types of particles is partially light-transmissive, while the remaining two types of non-white particles are light-reflective.

Figure 1:
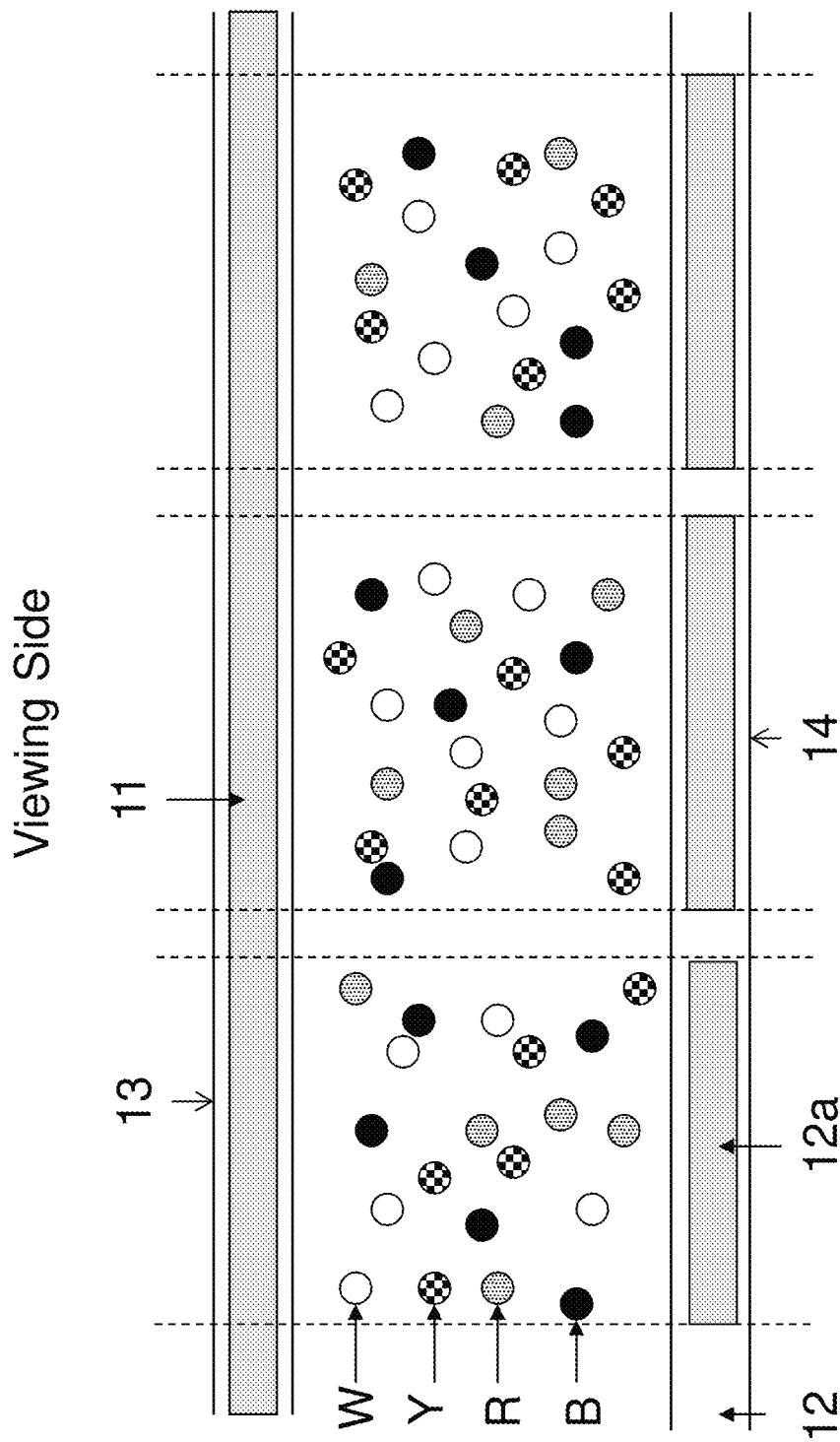
FIG. 1 of the accompanying drawings is a schematic cross-section through a four particle display device of the present invention.

As an example shown in FIG. 1, the blue particles (B) and yellow particles (Y) are the first pair of oppositely charged particles, and in this pair, the blue particles are the high positive particles and the yellow particles are the high negative particles. The red particles (R) and the white particles (W) are the second pair of oppositely charged particles, and in this pair, the red particles are the low positive particles and the white particles are the low negative particles. It will be appreciated that the aforementioned charges could be reversed in polarity and the display would continue to function in the same manner, except of course that the polarity of the driving waveforms described below would need to be reversed.

The white particles may be formed from an inorganic pigment, such as $TiO_2$, $ZrO_2$, $ZnO$, $Al_2O_3$, $Sb_2O_3$, $BaSO_4$, $PbSO_4$ or the like.

Particles of non-white and non-black colors are independently of a color, such as, red, green, blue, magenta, cyan or yellow. The pigments for color particles may include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. A preferred partially light-transmitting blue pigment for use in the display of FIG. 1 is Kremer 45030, "Ultramarine Blue, greenish extra", a sodium aluminum sulfosilicate pigment, C.I. Pigment Blue 29: 77007 available from Kremer Pigmente GmbH & Co. KG, Hauptstr. 41-47, DE-88317 Aichstetten, Germany. This light-transmitting blue pigment may usefully be used in combination with the aforementioned Hostaperm Red D3G 70 pigment.

Figure 2:
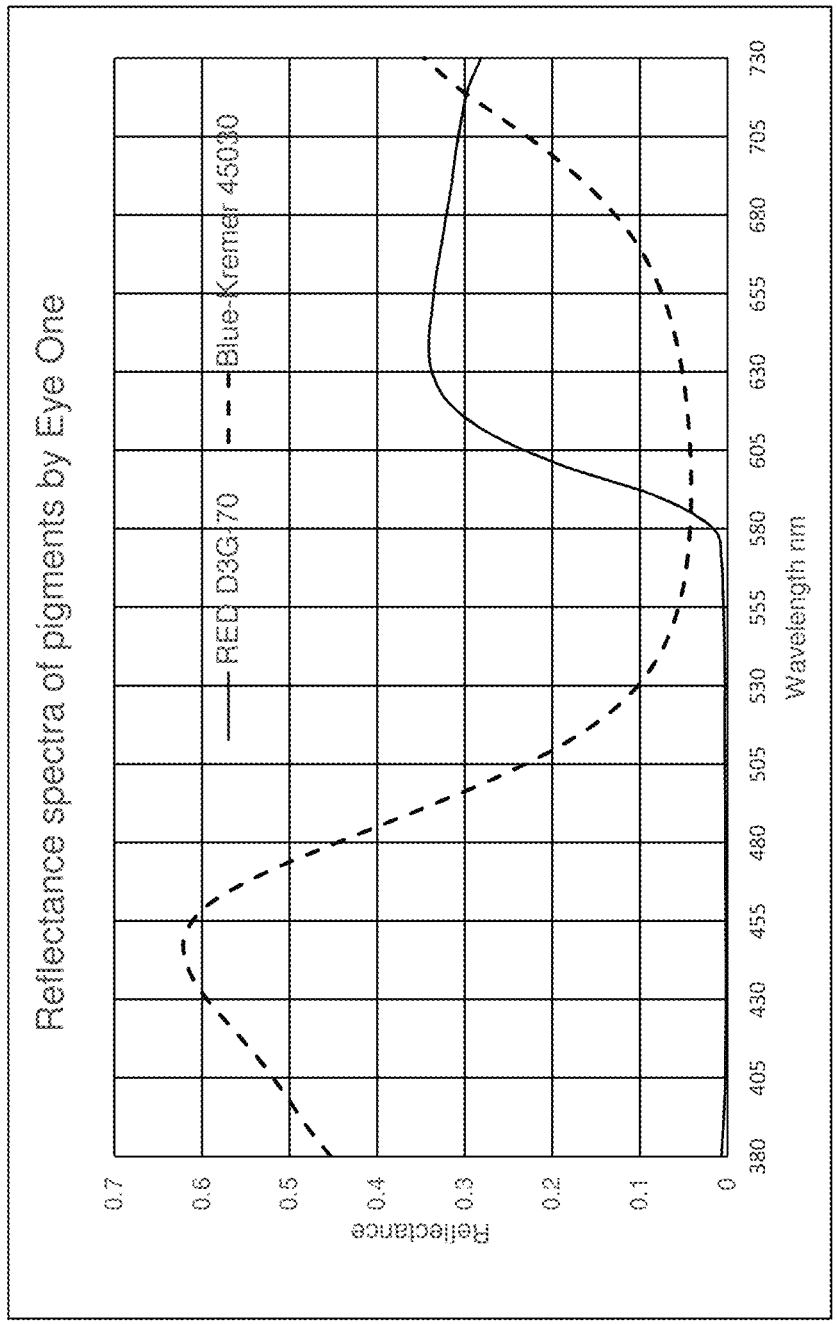
FIG. 2 shows absorption spectra of preferred pigment particles for use in the display device of FIG. 1.
Figure 3A:
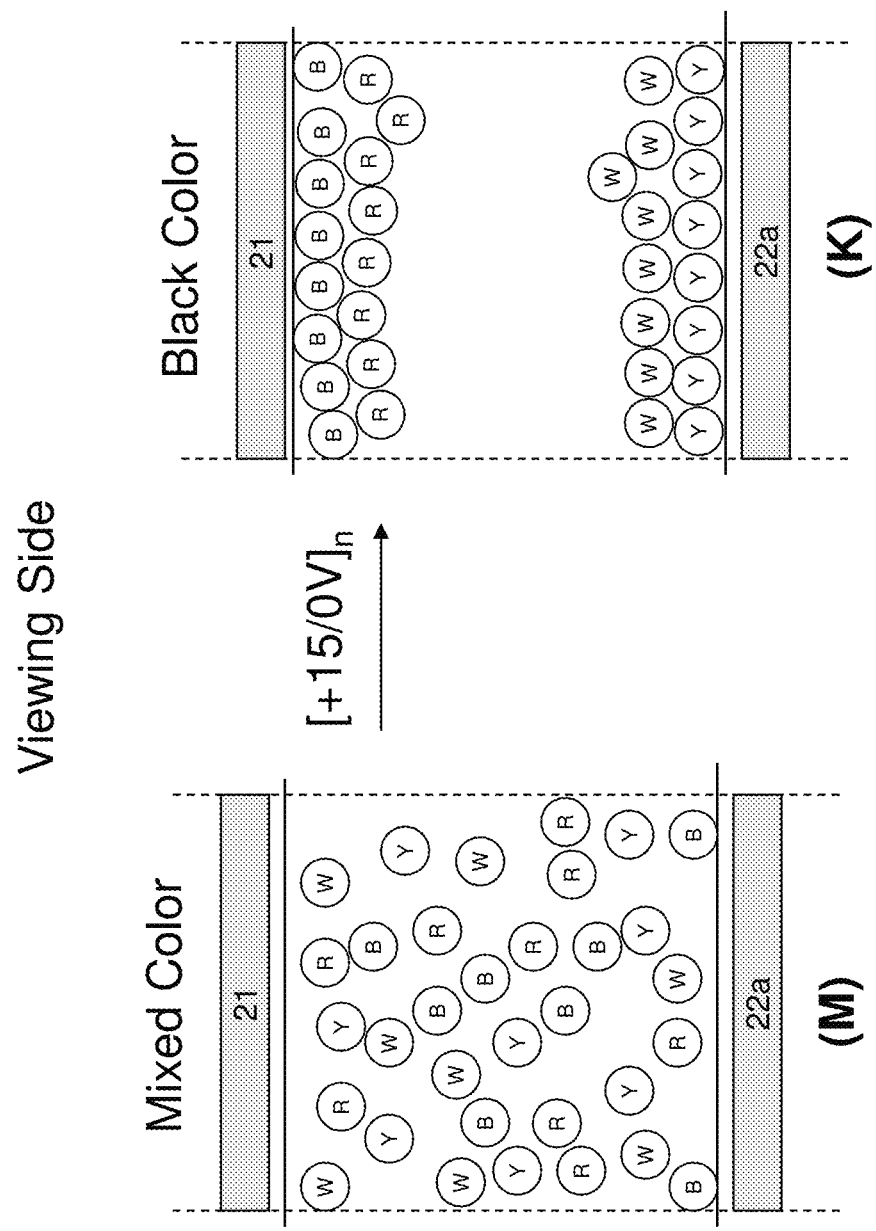
FIGS. 3A-3F are schematic cross-sections similar to that of FIG. 1 but showing various optical transitions which the display device of FIG. 1 can undergo.

As illustrated in FIG. 2, this blue pigment has peak transmission at about 450 nm and substantial transmission in the visible over the range of 400 to about 530 nm. The Hostaperm Red D3G 70 pigment, on the other hand, is essentially non-reflective below about 555 nm. Accordingly, when the two pigments are arranged as shown in FIG. 3A, with the light-transmissive blue pigment adjacent a viewing surface and the reflective red pigment immediately on the opposed side of the blue pigment from the viewing surface, all visible radiation which enters through the viewing surface and passes through the blue pigment will be absorbed by the red pigment and the viewing surface will appear black.

The non-white particles may also be inorganic pigments, such as red, green, blue and yellow. Examples may include, but are not limited to, CI pigment blue 28, CI pigment green 50 and CI pigment yellow 227.

In addition to the colors, the four types of particles may have other distinct optical characteristics, such as optical transmission, reflectance, and luminescence or, in the case of displays intended for machine reading, pseudo-color in the sense of a change in reflectance of electromagnetic wavelengths outside the visible range.

A display layer utilizing the display fluid of the present invention has, as shown in FIG. 1, two surfaces, a first surface (13) on the viewing side and a second surface (14) on the opposite side from the first surface (13). The display fluid is sandwiched between the two surfaces. On the side of the first surface (13), there is a common electrode (11) which is a transparent electrode layer (e.g., ITO), spreading over the entire top of the display layer. On the side of the second surface (14), there is an electrode layer (12) which comprises a plurality of pixel electrodes (12a). However, the invention is not restricted to any particular electrode configuration.

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel. As shown, each pixel has a corresponding pixel electrode. An electric field is created for a pixel by the potential difference between a voltage applied to the common electrode and a voltage applied to the corresponding pixel electrode. (Note that in the various waveforms illustrated in the accompanying drawings, the potential differences plotted are those applied the pixel electrode 12a, the common electrode being assumed to be, as is usually the case, held at ground voltage. Since the color displayed by the pixel is dependent upon the particles adjacent the common electrode 11, when a positive potential difference is shown in the drawings, the common electrode is negative relative to the pixel electrode and positively charged particles are drawn to the common electrode.)

The solvent in which the four types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as Isopar®, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoroethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-corning (DC-200).

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN #Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 19K, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow-through cell for determination of the zeta potential.

The amplitudes of the "high positive" particles and the "high negative" particles may be the same or different. Likewise, the amplitudes of the "low positive" particles and the "low negative" particles may be the same or different. However, the zeta potential of the "high positive" or positive particle with greater charge intensity or greater charge magnitude is larger than the zeta potential of the "low positive" or positive particle with lesser charge intensity or lesser charge magnitude, and the same logic follows for the high negative and low negative particles. In the same medium under the same field a higher charged particle will have a greater electrophoretic mobility, that is, the higher charged particle will traverse the same distance in less time than the lower charged particle.

It is also noted that in the same fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

The following Example illustrates a display device utilizing such a display fluid.

Example

This example is demonstrated in FIGS. 3A-3F. The high positive light-transmitting particles are of a blue color (B); the high negative particles are of a yellow color (Y); the low positive particles are of a red color (R); and the low negative particles are of a white color (W). The transition shown in FIG. 3A starts from a completely mixed state, denoted "(M)", produced by applying shaking pulses as described below. When alternating pulses of a high positive potential difference (e.g., +15V) and no potential difference (0 V) are applied to the pixel electrode 22a for a time period of sufficient length, the blue (B) and red (R) particles are driven towards the common electrode (21) or viewing side, and the yellow and white particles are driven towards the pixel electrode 22a side. The red (R) and white (W) particles, because they carry weaker charges, move slower than the highly charged blue and yellow particles. As a result, the blue particles lie immediately adjacent the common electrode, with the red particles immediately below them (as illustrated in FIG. 3A). For reasons already discussed above, this causes the pixel to appear black, denoted "(K)" in FIG. 3A; the white and yellow particles are masked by the reflecting red particles and do not affect the displayed color.

Similarly, the transition shown in FIG. 3B starts from the completely mixed state (M), produced by applying shaking pulses as described below. When alternating pulses of a high negative potential difference (e.g., −15V) and no voltage (0 V) are applied to the pixel electrode 22a for a time period of sufficient length, the blue (B) and red (R) particles are driven towards the pixel electrode 22a side, and the yellow and white particles to be driven towards the common electrode side. The red (R) and white (W) particles, because they carry weaker charges, move slower than the highly charged blue and yellow particles. As a result, the reflective yellow particles lie immediately adjacent the common electrode, thus causing the pixel to appear yellow, denoted "(Y)" in FIG. 3B; the white, red and blue particles are all masked by the reflecting yellow particles and do not affect the displayed color. Although in principle the yellow color can be produced by alternating pulses of −15V and 0 V, in practice a more complicated waveform is preferred, as described below with reference to FIG. 5B.

Figure 3B:
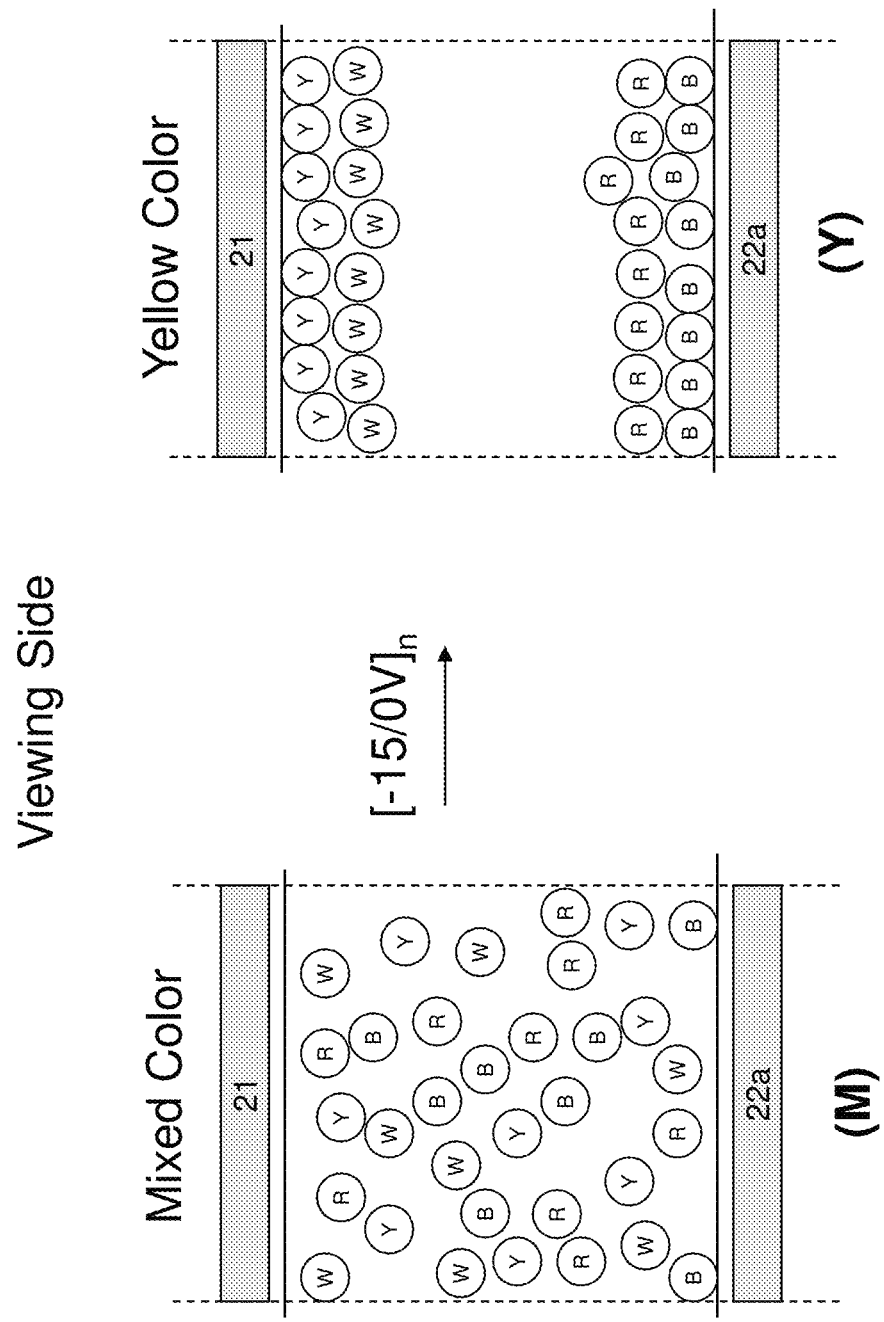
Figure 3C:
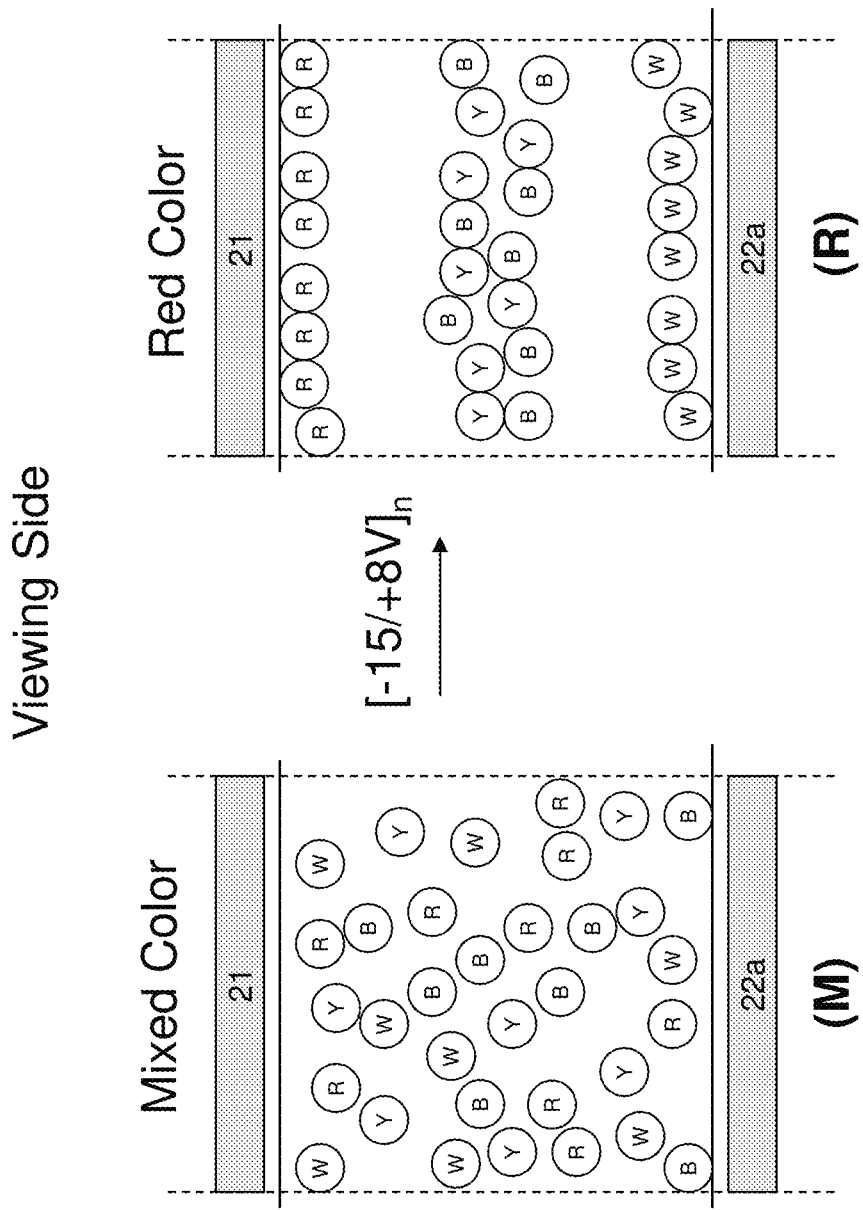

The transition shown in FIG. 3C starts from the completely mixed state (M). When alternating pulses of a high negative potential difference (e.g., −15V) and a low positive potential difference (e.g., +8V), with the low positive pulses being much longer than the high negative pulses, are applied to the pixel electrode 22a for a time period of sufficient length, the red (R) particles are driven towards the common electrode 21 side, and the white particles (W) are driven towards the pixel electrode 22a side. The effect of the oscillating electric field is to cause the highly charged blue and yellow particles to pass each other repeatedly in the middle of the thickness of the electrophoretic layer, and the strong electrical attraction between the highly charged positive and negative particles greatly slows the movement of these particles and tends to keep them in the middle of the thickness of the electrophoretic layer. However, the electric field generated by the low positive pulses is sufficient to separate the low charged white and red particles, thereby allowing the low positive red particles (R) to move all the way to the common electrode 21 side and the low negative white particles to move to the pixel electrode 22a side. As a result, the reflective red particles lie immediately adjacent the common electrode, thus causing the pixel to appear red, denoted "(R)" in FIG. 3C; the white, yellow and blue particles are all masked by the reflecting red particles and do not affect the displayed color. Importantly, this system allows weaker charged particles to be separated from the stronger charged particles of the opposite polarity.

Figure 3D:
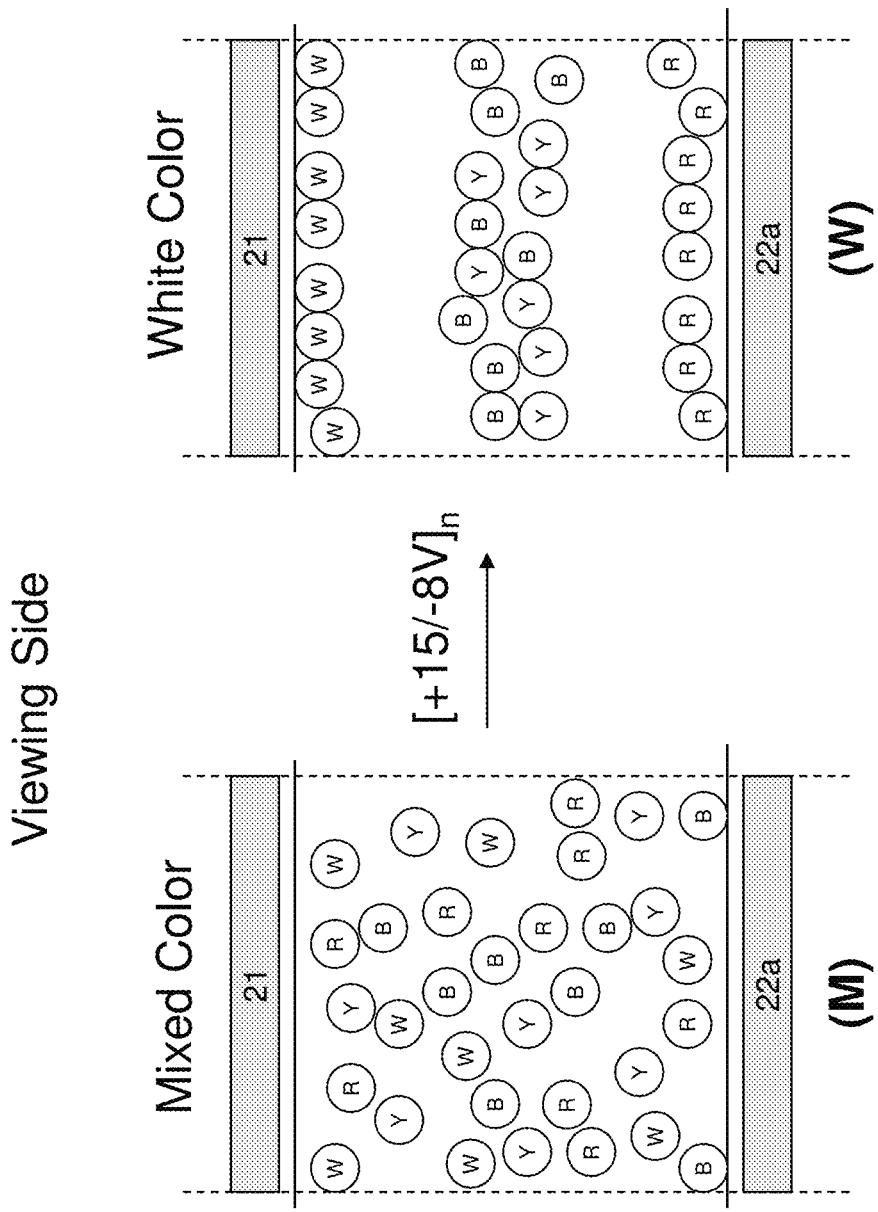

The transition shown in FIG. 3D starts from the completely mixed state (M). When alternating pulses of a high positive potential difference (e.g., +15V) and a low negative potential difference (e.g., −8V), with the low negative pulses being much longer than the high positive pulses, are applied to the pixel electrode 22a for a time period of sufficient length, the red (R) particles are driven towards the pixel electrode 22a side, and the white particles (W) are driven towards the common electrode 21 side. As in the transition shown in FIG. 3C, the effect of the oscillating electric field is to cause the highly charged blue and yellow particles to remain together in the middle of the thickness of the electrophoretic layer. However, the electric field generated by the low negative pulses is sufficient to separate the low charged white and red particles, thereby allowing the low positive red particles (R) to move all the way to the pixel electrode 22a side and the low negative white particles to move to the common electrode 21 side. As a result, the white particles lie immediately adjacent the common electrode, thus causing the pixel to appear white, denoted "(W)" in FIG. 3D; the red, yellow and blue particles are all masked by the white particles and do not affect the displayed color. Although in principle the white color can be produced by alternating pulses of +15 V and −8 V, in practice a more complicated waveform is preferred, as described below with reference to FIG. 5D.

Figure 3E:
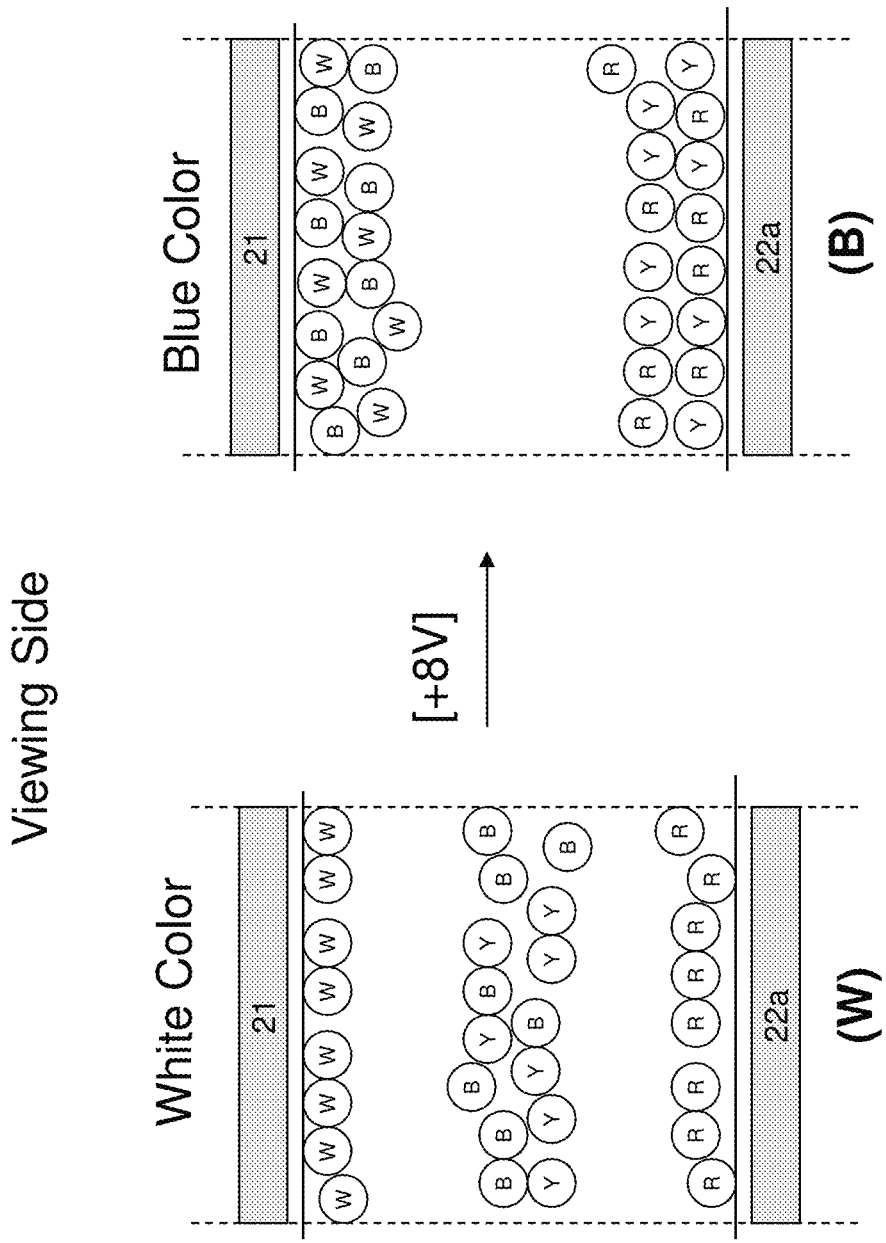

The transition shown in FIG. 3E starts from the white state (W) shown in FIG. 3D. To the device in this state is applied a positive potential difference pulse the overall impulse of which is not sufficient to drive the device to the black state (K) shown in FIG. 3A. The positive pulse causes the highly charged blue particles to move towards the common electrode 21 side and the white particles to move towards the pixel electrode 22a side. However, since the highly charged blue particles move more quickly than the low charged white particles, a mixture of the blue particles and the white particles is visible through the viewing surface, so that the pixel appears blue.

It might at first appear from FIG. 3E that the saturation of the blue color seen at the viewing surface would be substantially reduced because of reflection from white pigment disposed immediately adjacent the front electrode. However, it should be understood that FIG. 3E (and also FIGS. 3A-3D, 3F, 6A-6F and 7A-7F) are all highly schematic. In practice pigment particles are not spherical (because the crystalline pigments used fracture preferentially along certain crystal planes—for example, rutile titania, commonly used as the white pigment in electrophoretic media is tetragonal and tends to form square prisms), the particles vary considerably in size, the "reflection" from the white particles is essentially Lambertian light-scattering rather than specular reflection, and several more layers of particles are present than are illustrated in FIG. 3E. (The exact number of layers depends of course upon the particle loading in the electrophoretic medium, the thickness of this medium and the sizes of the individual particles, but in practice at least 5-10 layers are normally present.) The overall effect of all the foregoing factors is that only a very small proportion of the visible light entering the electrophoretic medium through the viewing surface is reflected directly back through the viewing surface by the white particles, and in practice a well saturated blue can be achieved.

Also, although FIG. 3A shows the blue and red particles in completely separate layers, whereas FIG. 3E shows a complete admixture of the blue and white particles, it will be appreciated that these represent two extreme states, and in practice there can be a continuous graduation between completely separate layers and complete admixture. Provided that the requisite colors are obtained, the present invention is not limited to any theoretical explanation regarding the exact positions of the particles and their degree of admixture with other particles.

Figure 3F:
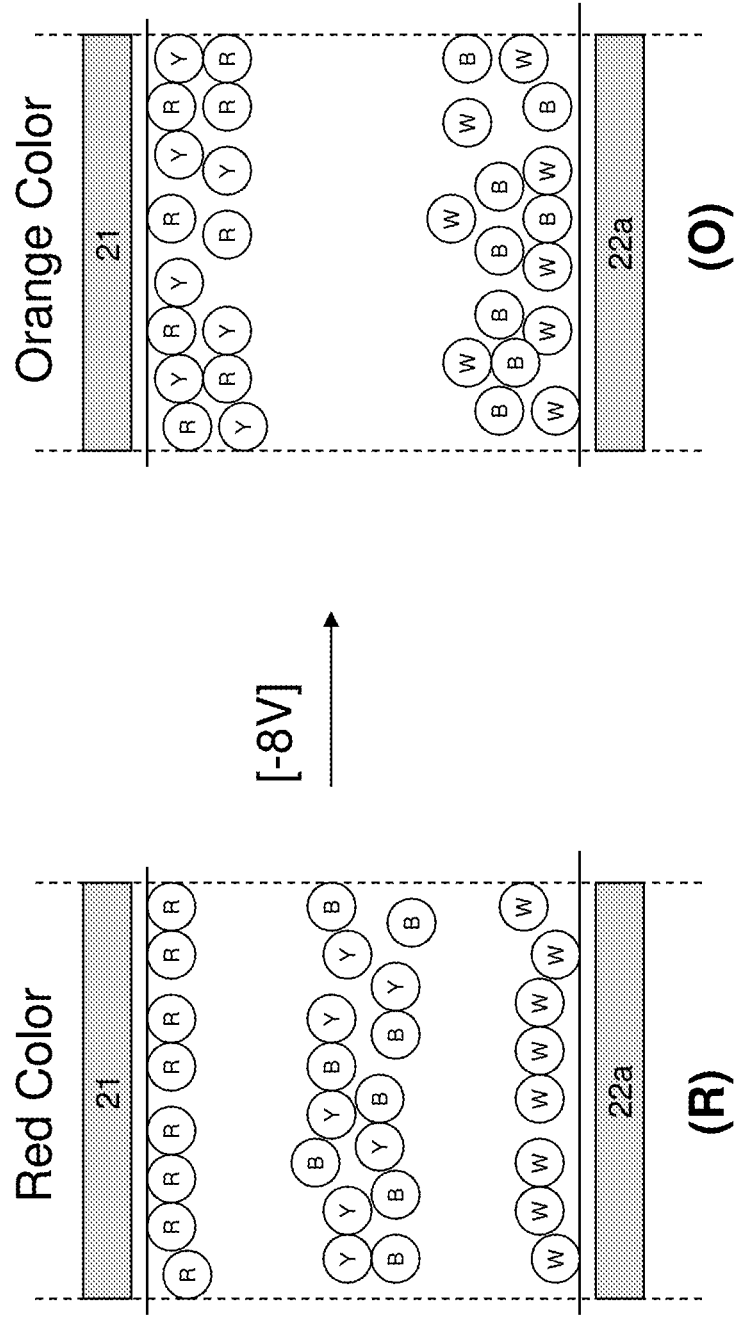

Finally, the transition shown in FIG. 3F starts from the red state (R) shown in FIG. 3C. To the device in this state is applied a negative potential difference pulse the overall impulse of which is not sufficient to drive the device to the yellow state (Y) shown in FIG. 3B. The negative pulse causes the highly negative yellow particles to move towards the common electrode (21) side, while the low positive red particles move much more slowly towards the pixel electrode (22a) side. The result is that a mixture of the red and yellow particles is visible through the common electrode 21 and the pixel appears orange.

In order to ensure both color brightness and color purity, prior to any of the transitions discussed above a DC balancing and/or shaking waveform may be used. The shaking waveform consists of repeating a pair of opposite driving pulses for many cycles. For example, the shaking waveform may consist of a +15V pulse for 20 msec and a −15V pulse for 20 msec and such a pair of pulses is repeated for 50 times. The total time of such a shaking waveform would be 2000 msec. In practice, there may be at least 10 repetitions (i.e., ten pairs of positive and negative pulses) in a shaking pulse. The shaking waveform may be applied regardless of the optical state (black, white, red or yellow) before a driving voltage is applied. After the shaking waveform is applied, the optical state would not be a pure white, pure black, pure yellow or pure red. Instead, the color state would be from a mixture of the four types of pigment particles.

Each of the driving pulses in the shaking waveform is applied for not exceeding 50% (or not exceeding 30%, 10% or 5%) of the driving time required from the full transition from the color of one highly charged particle to the color of the other highly charged particle (blue to yellow, or vice versa, in this example). For example, if it takes 300 msec to drive a display device from a full black state to a full yellow state, or vice versa, the shaking waveform may consist of positive and negative pulses, each applied for not more than 150 msec. In practice, it is preferred that the pulses are shorter. The shaking waveform as described may be used in the driving methods of the present invention. In all the drawings throughout this application, the shaking waveform is abbreviated (i.e., the number of pulses is fewer than the actual number).

A DC balancing waveform is designed to reduce the overall impulse (i.e., the integral of the voltage with respect to time) of the overall waveform to a small value, and if possible zero. As discussed for example in U.S. Pat. Nos. 6,531,997 and 6,504,524, problems may be encountered, and the working lifetime of a display reduced, if the method used to drive the display does not result in zero, or near zero, net time-averaged applied electric field across the electro-optic medium. A waveform, which does result in zero net time-averaged applied electric field across the electro-optic medium, is conveniently referred to a "direct current balanced" or "DC balanced" waveform.

Figure 4:
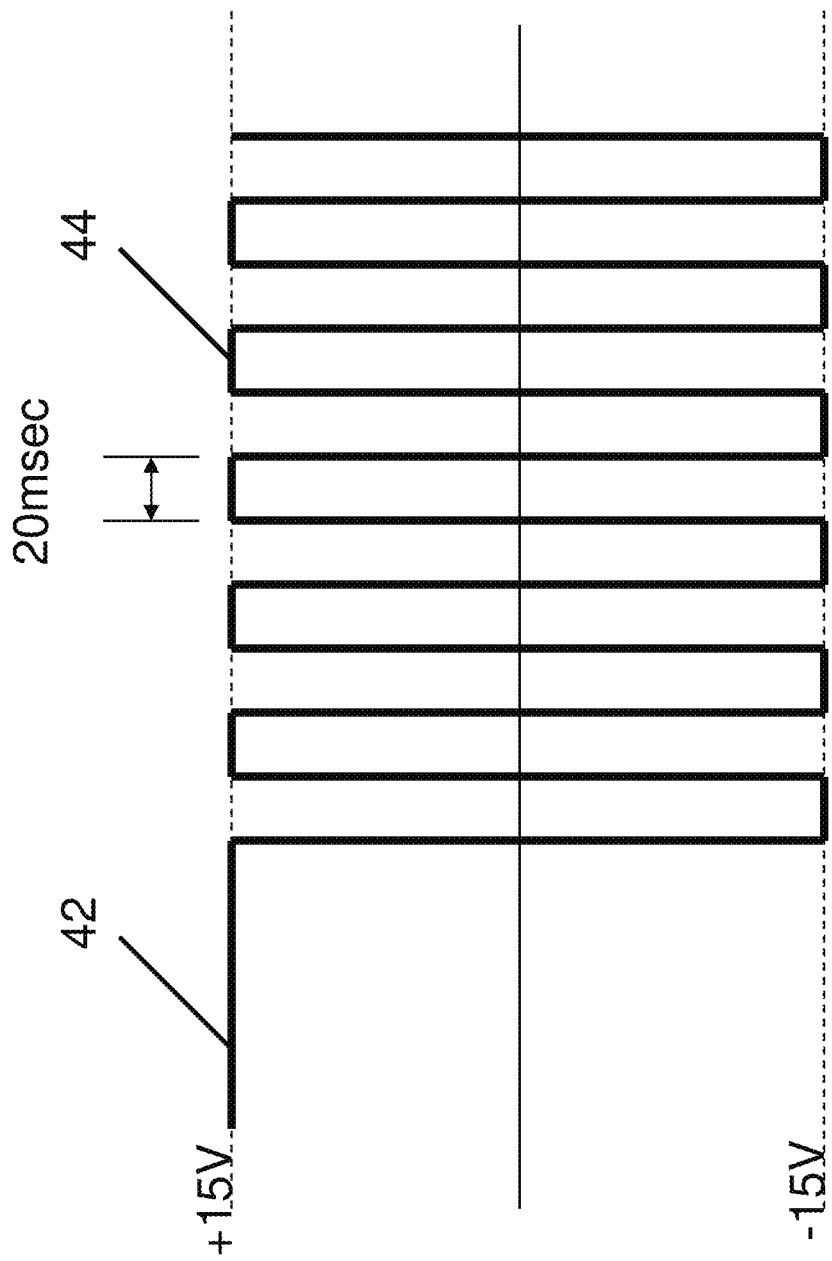
FIG. 4 illustrates a DC balancing waveform and a shaking waveform, which can be incorporated into the driving methods of the present invention.

FIG. 4 illustrates a combined DC balancing/shaking waveform comprising a DC balancing section 42 followed by a shaking section 44. Although FIG. 4 illustrates the DC balancing section 42 as having a high positive potential difference, it will be appreciated that the DC balancing section may have a high or low, positive or negative potential difference, or a zero potential difference, depending upon the impulse of the remainder of the applied waveform.

Furthermore, although FIG. 4 illustrates a single DC balancing section followed by a single shaking section, a combined DC balancing/shaking waveform may contain multiple DC balancing sections and multiple shaking sections alternating with one another, and may begin and end with either a DC balancing section or a shaking section. The use of multiple DC balancing sections may be advantageous in that, by (say) setting one or more DC balancing sections to a high voltage and one or more to zero, it may be possible to achieve a closer approach to zero overall waveform impulse than with a single DC balancing section. Multiple DC balancing sections may vary from each other in both duration and applied potential difference. Similarly, multiple shaking sections may differ from each other in duration, magnitude of potential difference and frequency.

Figure 5A:
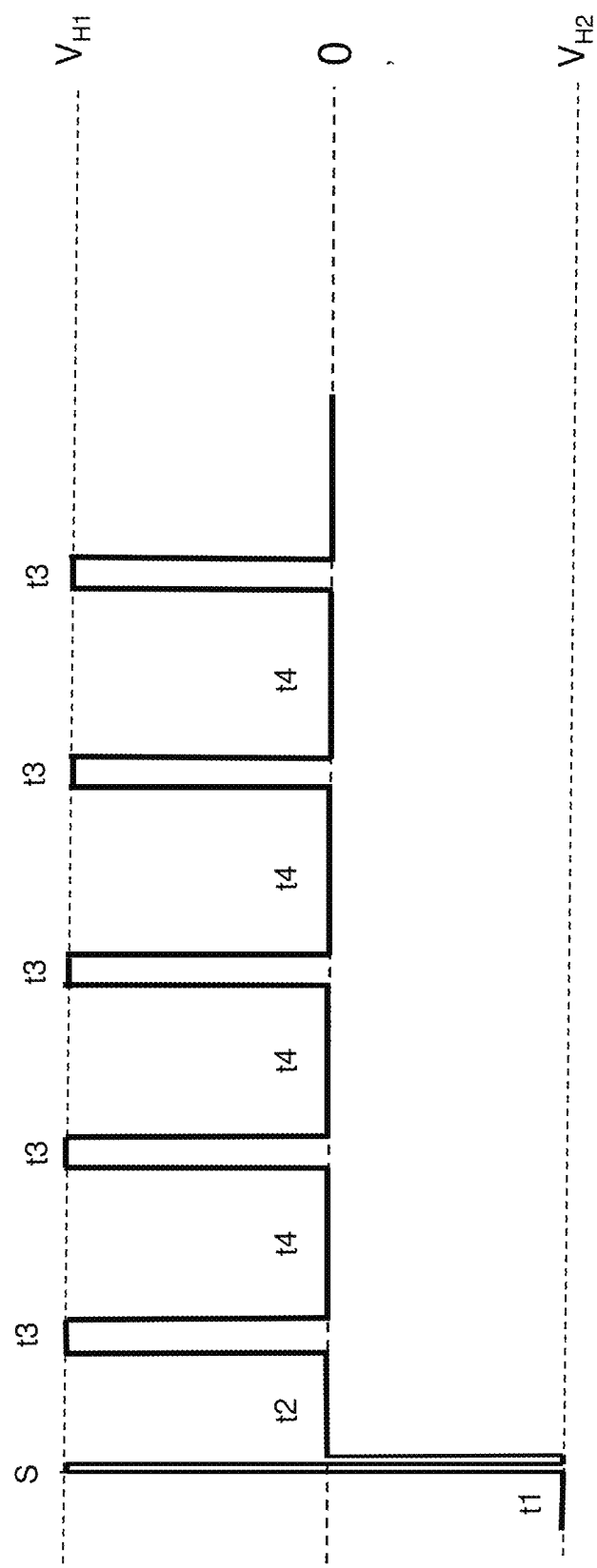
FIGS. 5A-5F shown waveforms that may be used to carry out the transitions shown in FIGS. 3A-3F respectively.

FIG. 5A illustrates the waveform used to effect the transition of FIG. 3A to produce a black optical state; this waveform is an example of the first driving method of the present invention. After a DC balancing section of duration t1 at a high negative voltage VH2, and a shaking section S, to achieve the mixed state M (the duration of both t1 and the shaking section S are greatly reduced in FIG. 5A, and multiple DC balancing and shaking sections may of course be used), there is applied to the pixel electrode (i) a period of zero voltage of duration t2; (ii) a period of high positive driving voltage VH1 of duration t3; (iii) a period of zero voltage of duration t4 substantially greater than t3; and (iv) several repetitions of (ii) and (iii), typically 4-8 repetitions.

Figure 5B:
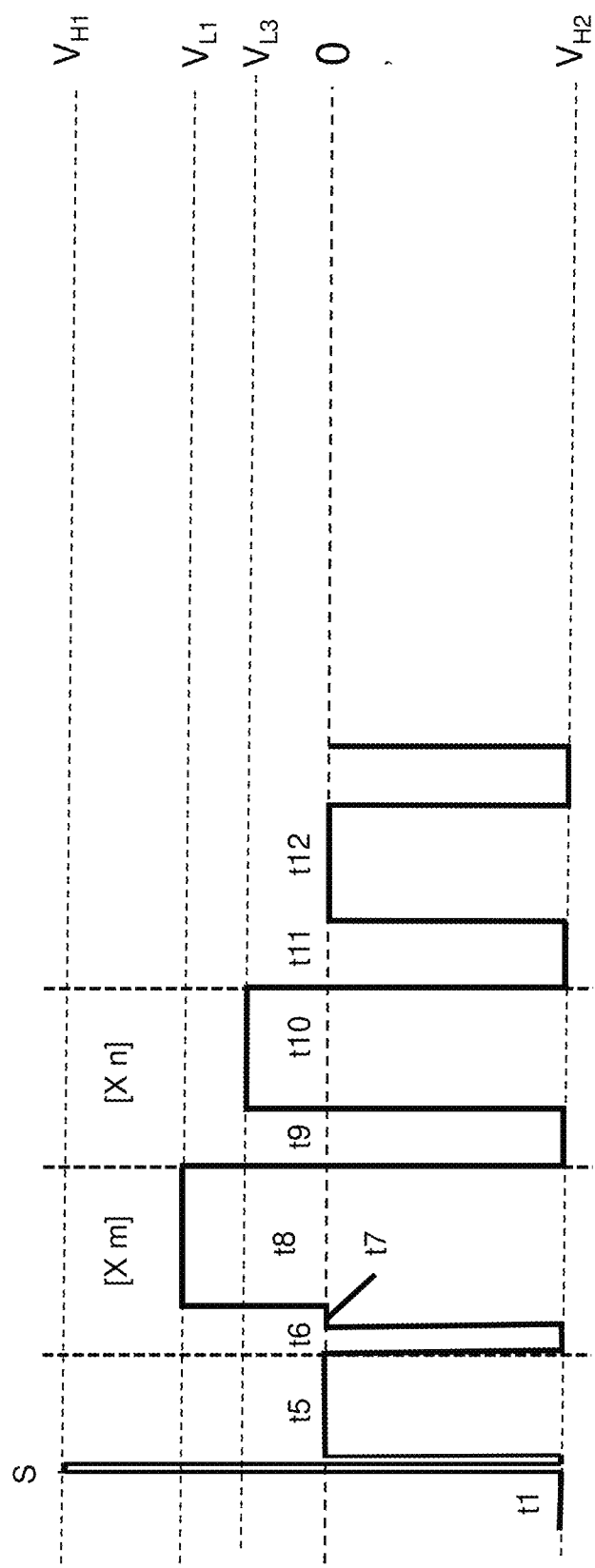

FIG. 5B illustrates the waveform used to effect the transition of FIG. 3B to produce a yellow optical state (i.e., the color of the second particle). As already indicated, in principle a yellow color can be produced by applying alternating pulses of a high negative potential difference (e.g., −15 V) and no voltage (0 V) the pixel electrode 22a for a time period of sufficient length. However, to ensure a pure yellow color a much more complicated waveform is preferred, as shown in FIG. 5B. After a DC balancing section of duration t1 and a shaking section S essentially identical to those already described with reference to FIG. 5A, the waveform of FIG. 5B comprises a period of zero voltage of duration t5, followed by (i) a short period of duration t6 of a high negative potential difference VH2; (ii) a period of zero voltage of duration t7; and (iii) a period of a low positive potential difference VL1 for a period t8 longer than t6. Typically, the magnitude of VL1 is about half that of VH2, t7 is comparable in length to t6 and t8 is about ten times as large as t6. For example, each of t6 and t7 may be 50 msec, while t8 may be 500 msec. Steps (i), (ii) and (iii) are then repeated several times, as indicated by "[X m]" in FIG. 5B; typically, these steps may be repeated 4-6 times. Following these repetitions, (iv) the high negative potential difference VH2 is applied for a period t9 longer than t6, and then (v) a low positive potential difference VL3, lower than VL1 and typically about one-third of VH1, is applied for a period t10 shorter than t8. Steps (iv) and (v) are then repeated, as indicated by "[X n]" in FIG. 5B; typically, these steps may be repeated 2-3 times. The final portion of the waveform of FIG. 5B comprises the application of the high negative potential difference VH2 for a period t11 longer than t9, a period of zero voltage of duration t12 and a second application of the high negative potential difference VH2 for a period t11. As will readily be apparent, the number of applications of VH2 and the durations t11 in this portion of the waveform can be adjusted empirically.

Figure 5C:
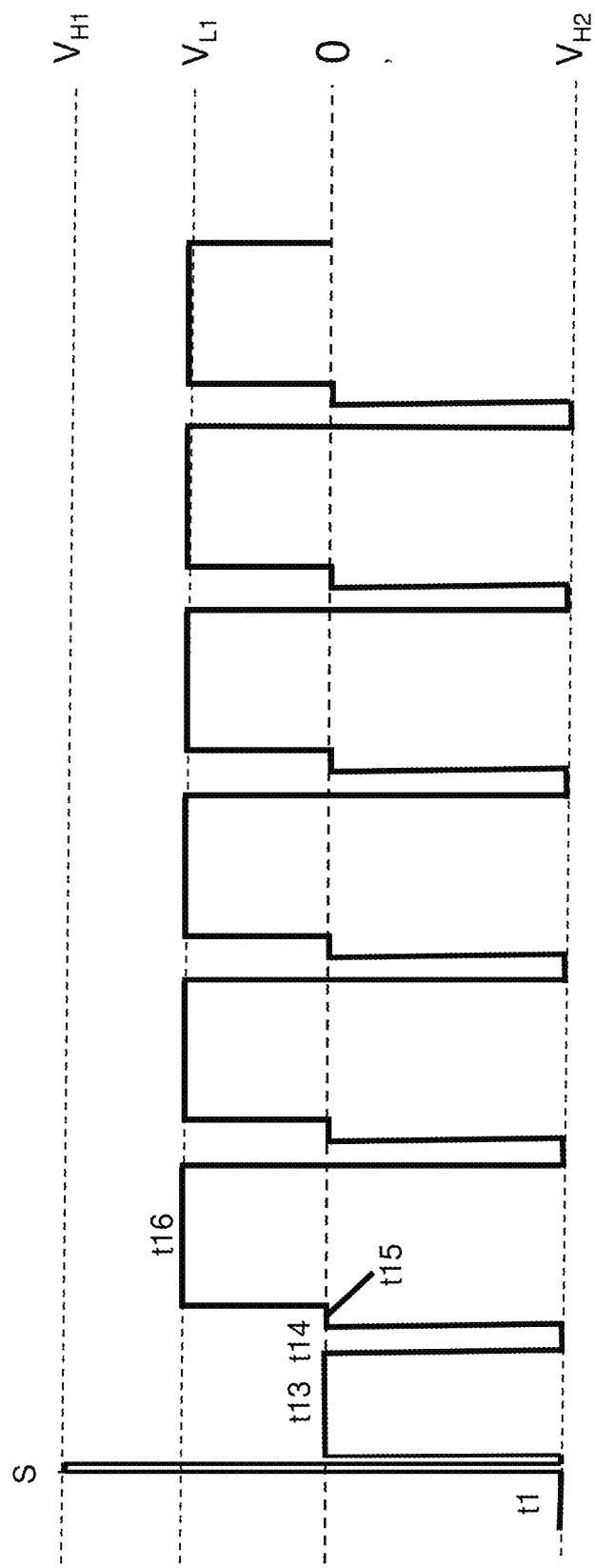

FIG. 5C illustrates the waveform used to effect the transition of FIG. 3C to produce a red optical state (i.e., the color of the second particle). The waveform shown in FIG. 5C closely resembles the first portion of the waveform shown in FIG. 5B; after a DC balancing section of duration t1 and a shaking section S essentially identical to those already described with reference to FIG. 5A, the waveform of FIG. 5C comprises a period of zero voltage of duration t13, followed by (i) a short period of duration t14 of a high negative potential difference VH2; (ii) a period of zero voltage of duration t15; and a period of a low positive potential difference VL1 for a period t16 longer than t14. Typically, the magnitude of VL1 is about half that of VH2, t15 is comparable in length to t14 and t16 is about ten times as large as t14. For example, each of t6 and t7 may be 50 msec, while t8 may be 500 msec. Steps (i), (ii) and (iii) are then repeated several times, as shown in FIG. 5C; typically, these steps may be repeated 6-10 times. The waveform terminates by transitioning from the final application of VL1 to 0 V to ensure a good red color. As will readily be apparent, the number of applications of VH2 and VL1 and the durations t14 and t16 in this waveform can be adjusted empirically.

Figure 5D:
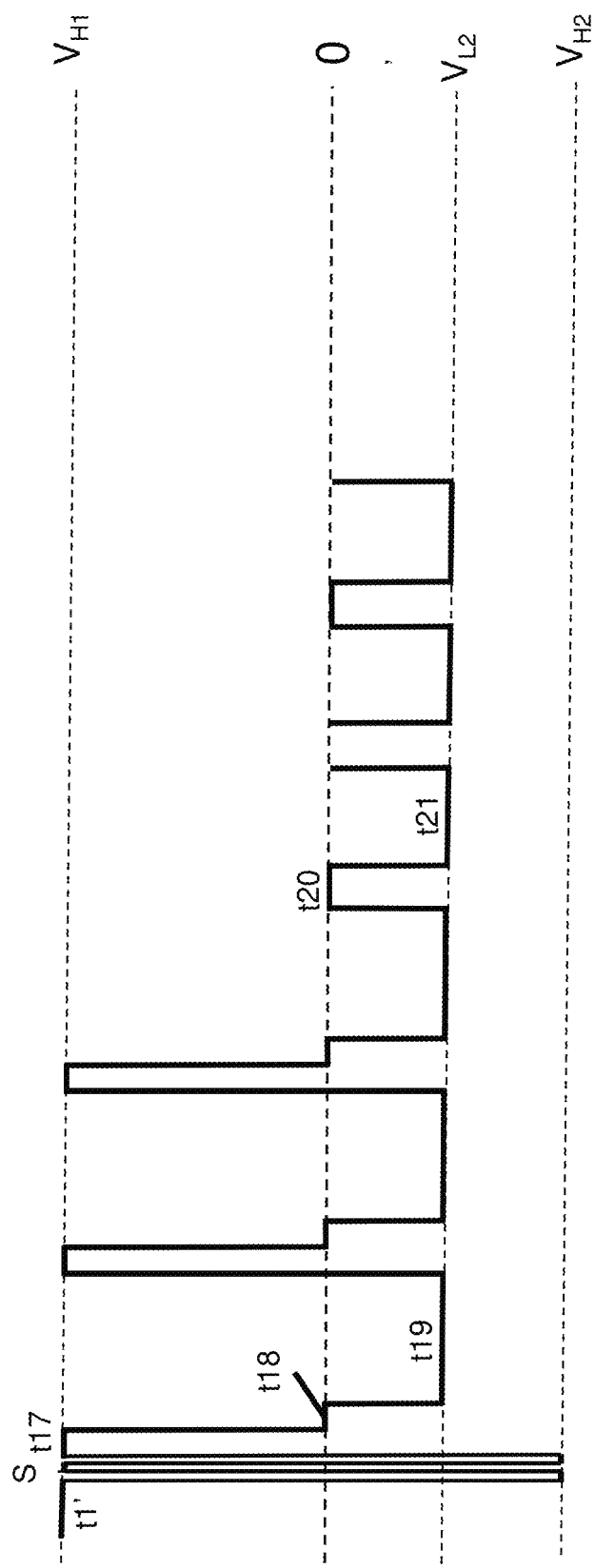

FIG. 5D illustrates the waveform used to effect the transition of FIG. 3D to produce a white optical state (i.e., the color of the fourth particle). Not surprisingly, the first part of the waveform shown in FIG. 5D closely resembles the "red" waveform shown in FIG. 5C but with a change in polarity; after a DC balancing section of duration t1' (the DC balancing section is high positive in this instance) and a shaking section S essentially identical to those already described with reference to FIG. 5A, the waveform of FIG. 5D comprises (i) a short period of duration t17 of a high positive potential difference VH1 (note that in this instance there is no period of zero voltage between the shaking section S and the application of a high driving potential difference) (ii) a period of zero voltage of duration t18; and a period of a low negative potential difference VL2 for a period t19 longer than t17. Typically, the magnitude of VL2 is about half that of VH1, t18 is comparable in length to t17 and t19 is about ten times as large as t17. For example, each of t6 and t7 may be 50 msec, while t8 may be 500 msec. Steps (i), (ii) and (iii) are then repeated several times, as shown in FIG. 5D; typically, these steps may be repeated 6-10 times. However, to ensure a pure white color, it has been found advantageous to follow the repetitions of steps (i), (ii) and (iii) with (iv) a period for zero potential difference of duration t20; (v) application of the low negative potential difference VL2 for a period t21; and repetition of steps (iv) and (v). Typically, steps (iv) and (v) will be repeated 6-10 times, t20 will be comparable to t18, and t21 will be shorter than t19. As will readily be apparent, the number of applications of VH1 and VL2 and the durations t17, t18, t19, t20 and t21 in this waveform can be adjusted empirically.

Figure 5E:
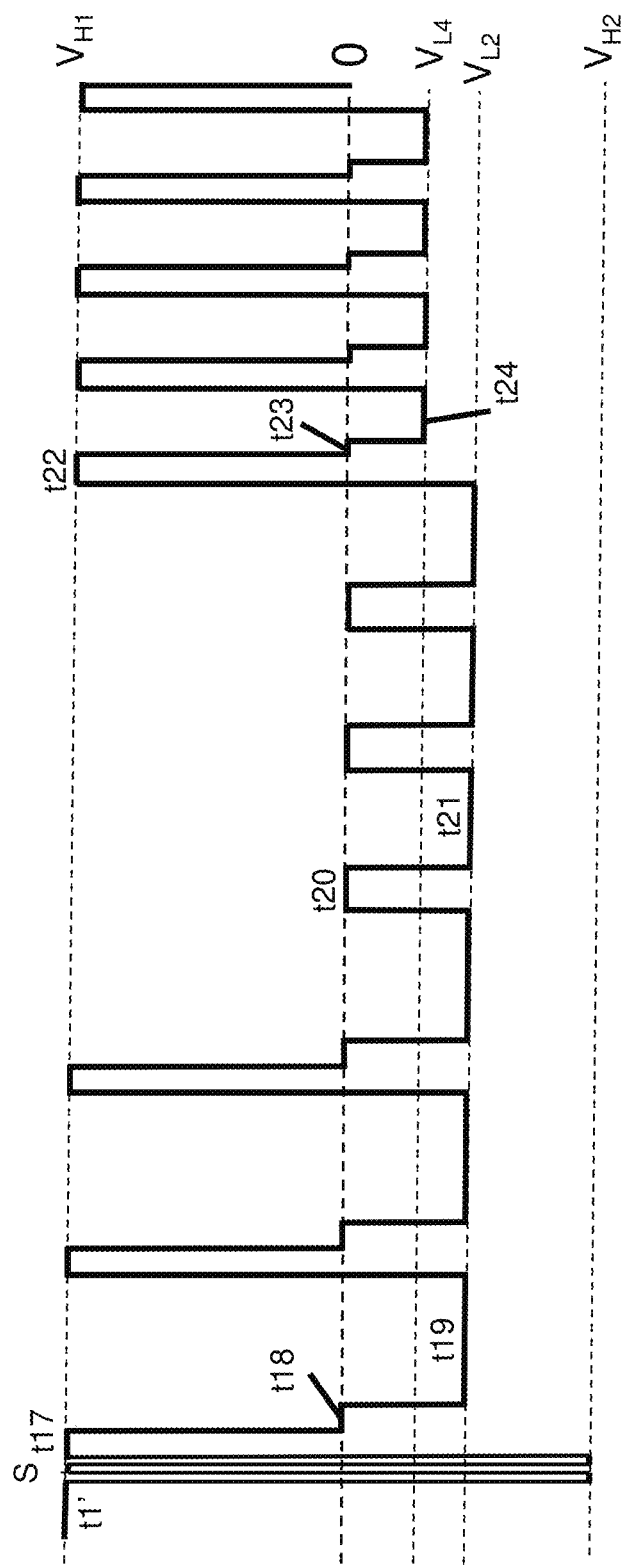

FIG. 5E illustrates the waveform used to effect the transition of FIG. 3E to produce a blue optical state (i.e., the color of the first particle); this waveform is an example of the second driving method of the present invention. Not surprisingly, the first part of the waveform shown in FIG. 5E is identical to the "white" waveform shown in FIG. 5D. However, after the repetitions of steps (iv) and (v) discussed in the preceding paragraph, the waveform of FIG. 5E continues with (vi) application of the high positive potential difference VH1 for a period t22 shorter than t17; (vii) application of zero potential difference for a period t23 shorter than t18; (viii) application of a low negative potential difference VL4, having a smaller magnitude than VL2 for a period t24 shorter than t19 or t21; and repetition of steps (vi)-(viii), but ending with a repetition of step (vi) not followed by a repetition of step (viii), i.e., with a final positive drive pulse, as described above with reference to FIG. 3E. Typically, the magnitude of VL4 is about 75 percent that of VL2, and typically steps (vi)-(viii) may be repeated 10-20 times. As will readily be apparent, the number of applications of VH1 and VL4 and the durations t22, t23 and t24 in this waveform can be adjusted empirically.

Figure 5F:
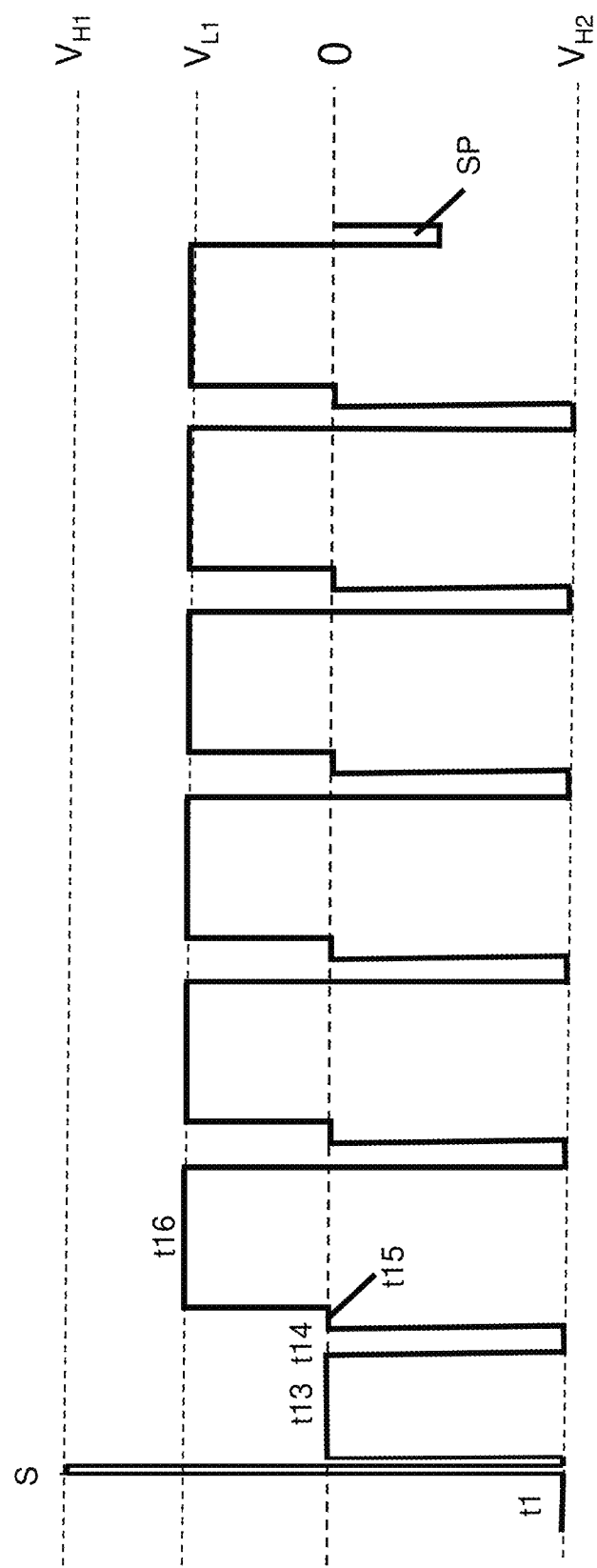

Finally, FIG. 5F shows the waveform used to effect the transition shown in FIG. 3F to produce an orange optical state; this waveform is an example of the third driving method of the present invention. The waveform shown in FIG. 5F is identical to the "red" waveform shown in FIG. 5C except for the addition of final short low negative potential difference pulse SP, the impulse of which is insufficient to drive the electrophoretic medium from the red optical state (R) to the yellow optical state (Y) (see FIG. 3B). The magnitude and duration of the pulse SP can vary widely and the optical combination of magnitude and duration may be determined empirically.

A four particle electrophoretic medium as shown in FIG. 1 was formulated using the aforementioned Kremer 45030 as a partially light-transmissive blue pigment, a rutile titania white pigment and light reflective 1254 DPP Red 254 (available from DCL Corporation) and Novoperm Yellow HR 70-EDS (available from Clariant Corporation, Holden MA) in Isopar E, with the addition of a charge control agent pigments. Even using non-optimized waveforms, the following five colors were produced:

TABLE

| Color | L* | a* | b* |
|---|---|---|---|
| White | 63 | −2.4 | 2.6 |
| Blue | 30.2 | 4.2 | −35.4 |
| Red | 26.8 | 37.9 | 24.6 |
| Yellow | 58.8 | 4.6 | 54.2 |
| Black | 13.1 | 7.2 | −8.5 |

The electrophoretic medium shown in FIGS. 1, 3A-3F and 5A-5F comprises a first type of partially light-transmitting high positive blue particle, a second type of reflective high negative yellow particle, a third type of reflective low positive red particle and a fourth type of low negative white particle. However, other colors can be produced by making the partially light-transmitting high positive particle red, and the reflective low positive particle blue; in particular, this combination allows the electrophoretic medium to display black, white, red, blue and green colors, as shown in FIG. 6A-6F below. Thus, this system is capable of displaying black, white and the three normal additive primary colors; additional colors may be generated by areal modulation (dithering).

Figure 6A:
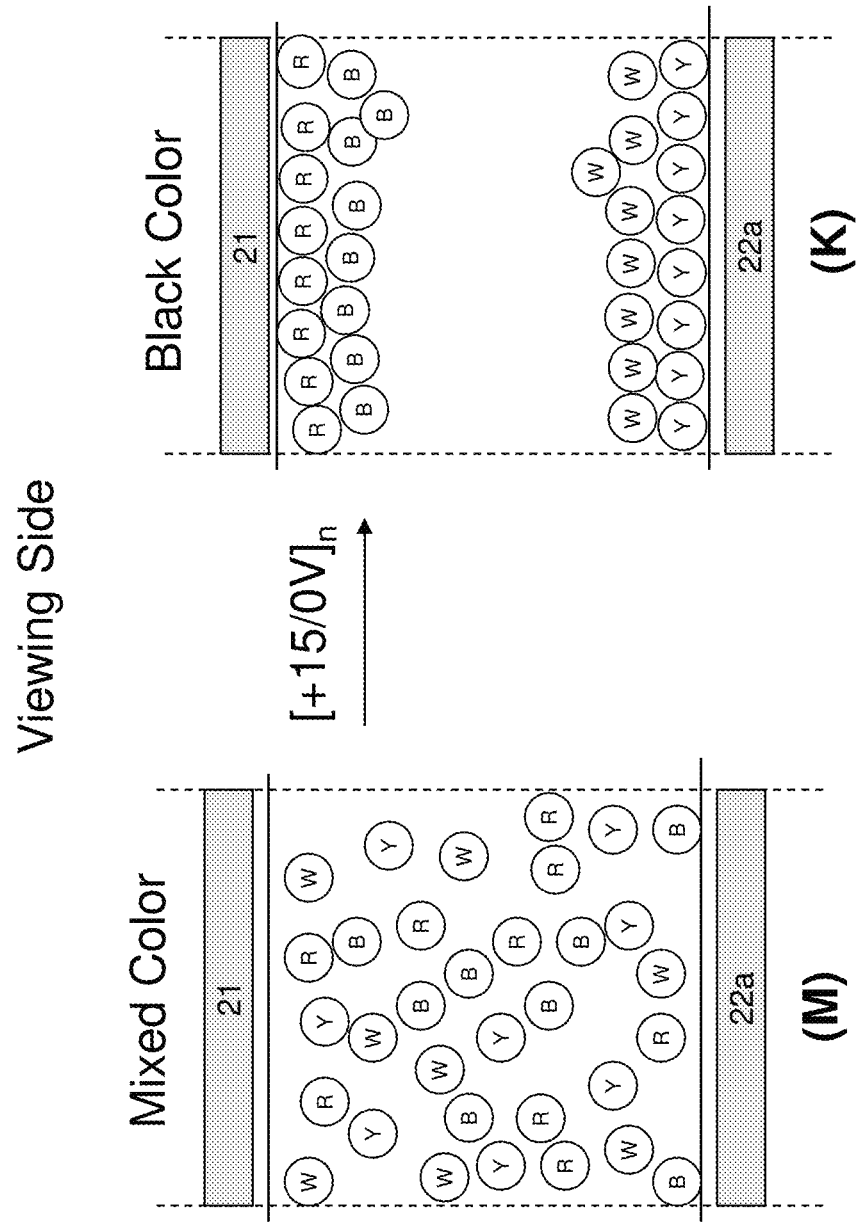
FIGS. 6A-6F are schematic cross-sections similar to those of FIGS. 3A-3F but showing various optical transitions in a display device using a red partially light-transmissive particle.

FIG. 6A shows a transition similar to that shown in FIG. 3A, starting from the completely mixed state (M). In the final state (K), the red light-transmissive particles lie immediately adjacent the common electrode 21, with the blue reflective particles immediately below them (as illustrated in FIG. 6A) so that, despite the reversal of the positions of the red and blue particles as compared with FIG. 3A, a black optical state is still generated.

Figure 6B:
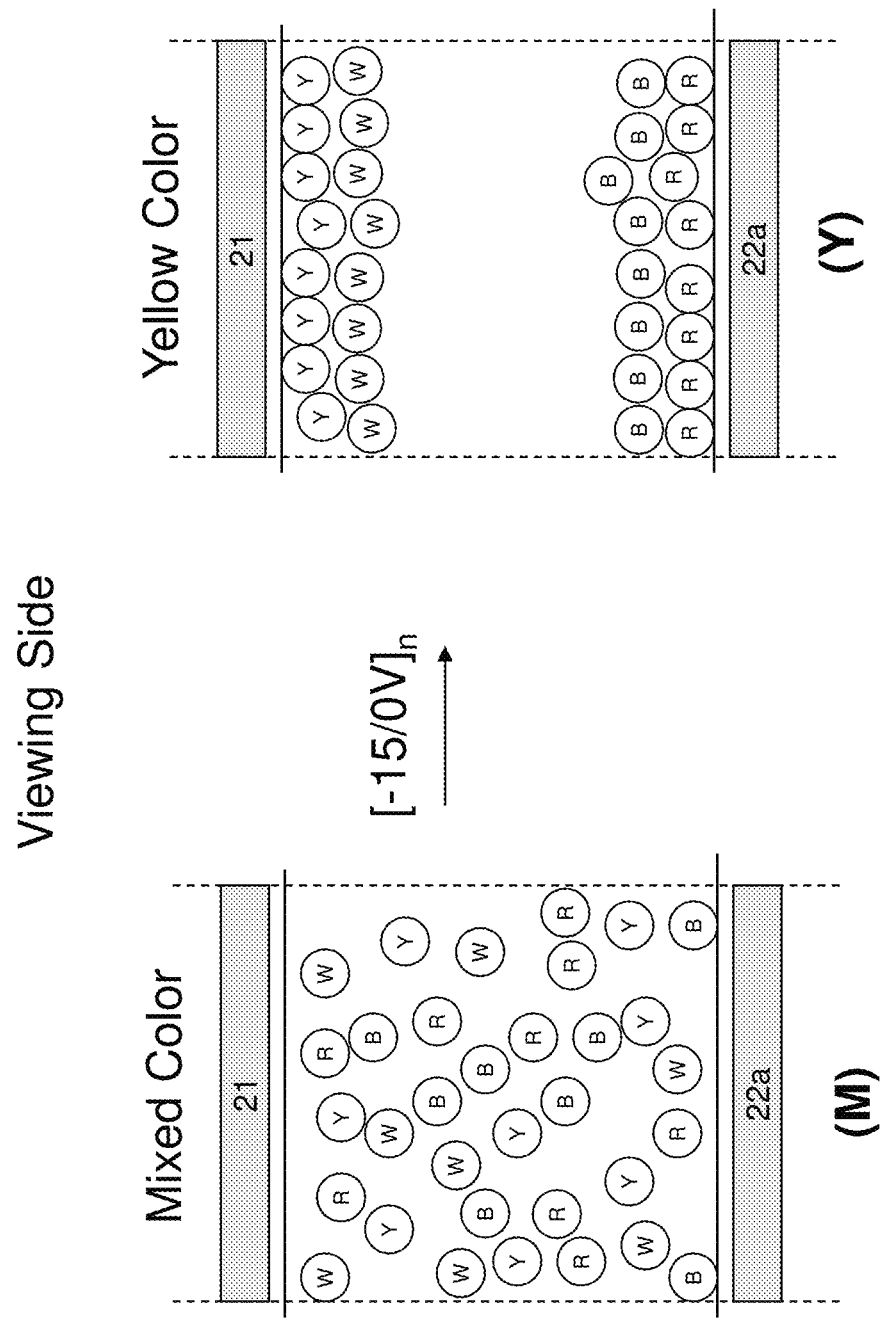

FIG. 6B shows a transition similar to that shown in FIG. 3B. A yellow state is again produced, since the yellow particles adjacent the common electrode mask the white, red and blue particles, so that the reversal of the positions of the red and blue particles in FIG. 6B, as compared with FIG. 3B, has no effect upon the optical state.

Figure 6C:
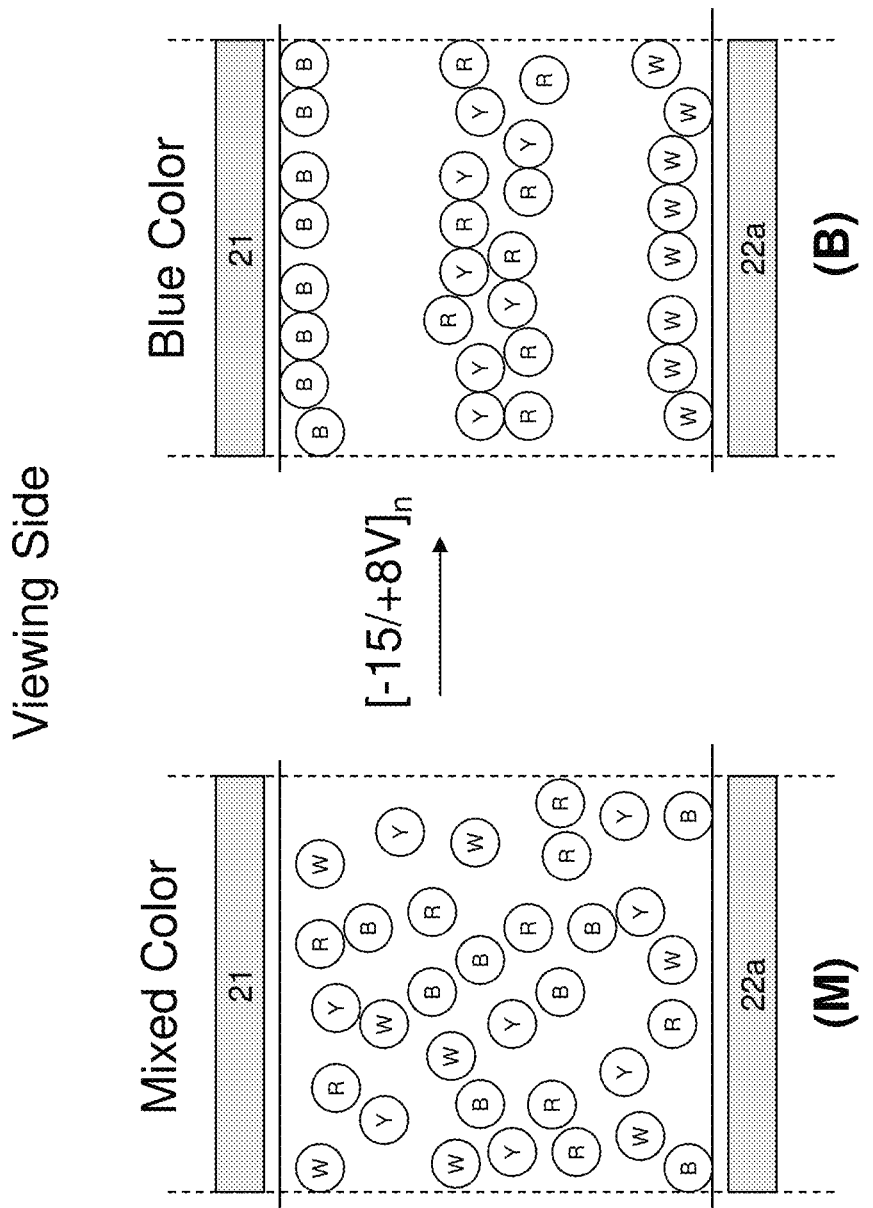

FIG. 6C shows a transition similar to that shown in FIG. 3C. As in FIG. 3C, the transition of FIG. 6C brings the low positive particles adjacent the common electrode, and since these low positive particles are now the reflective blue particles, a blue optical state is produced rather than the red optical state of FIG. 3C.

Figure 6D:
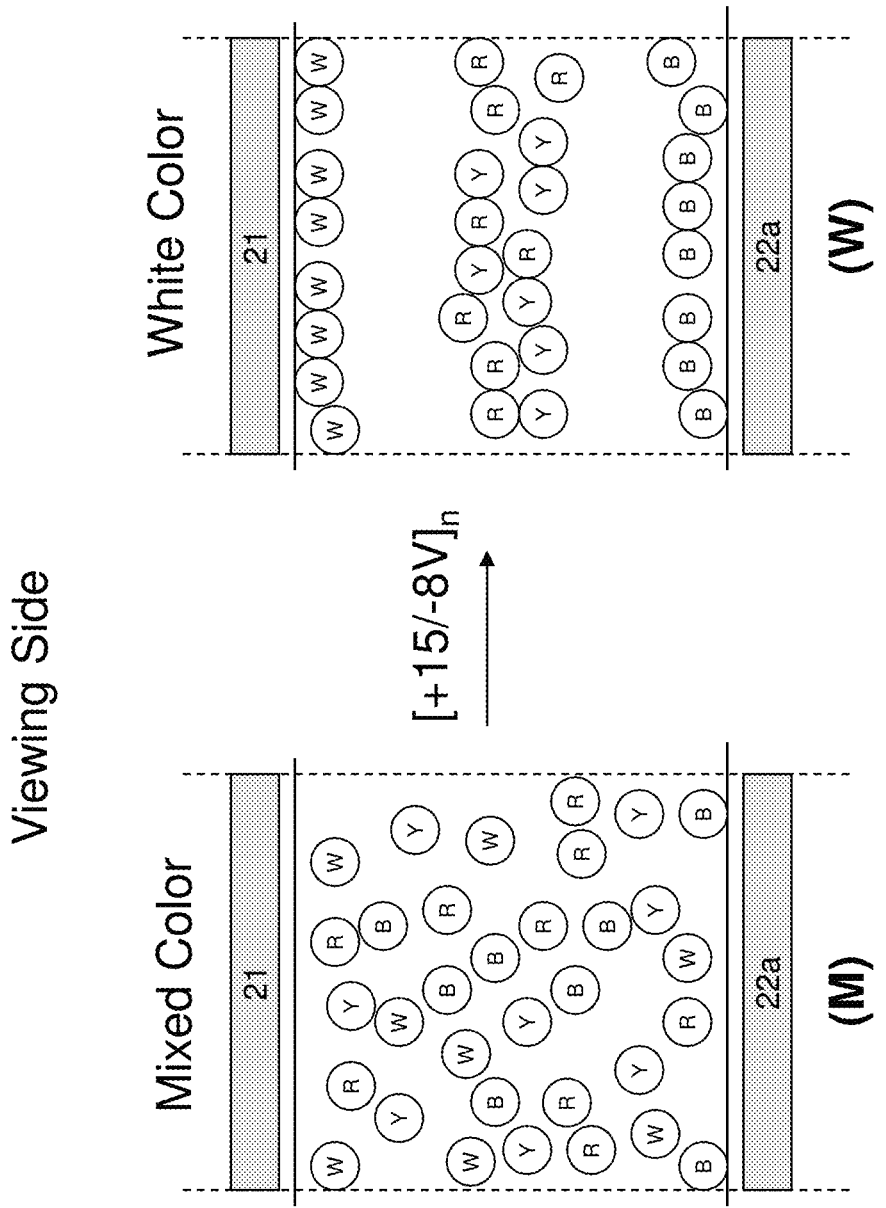

FIG. 6D shows a transition similar to that shown in FIG. 3D. A white state is again produced, since the white particles adjacent the common electrode mask the yellow, red and blue particles, so that the reversal of the positions of the red and blue particles in FIG. 6D, as compared with FIG. 3D, has no effect upon the optical state.

Figure 6E:
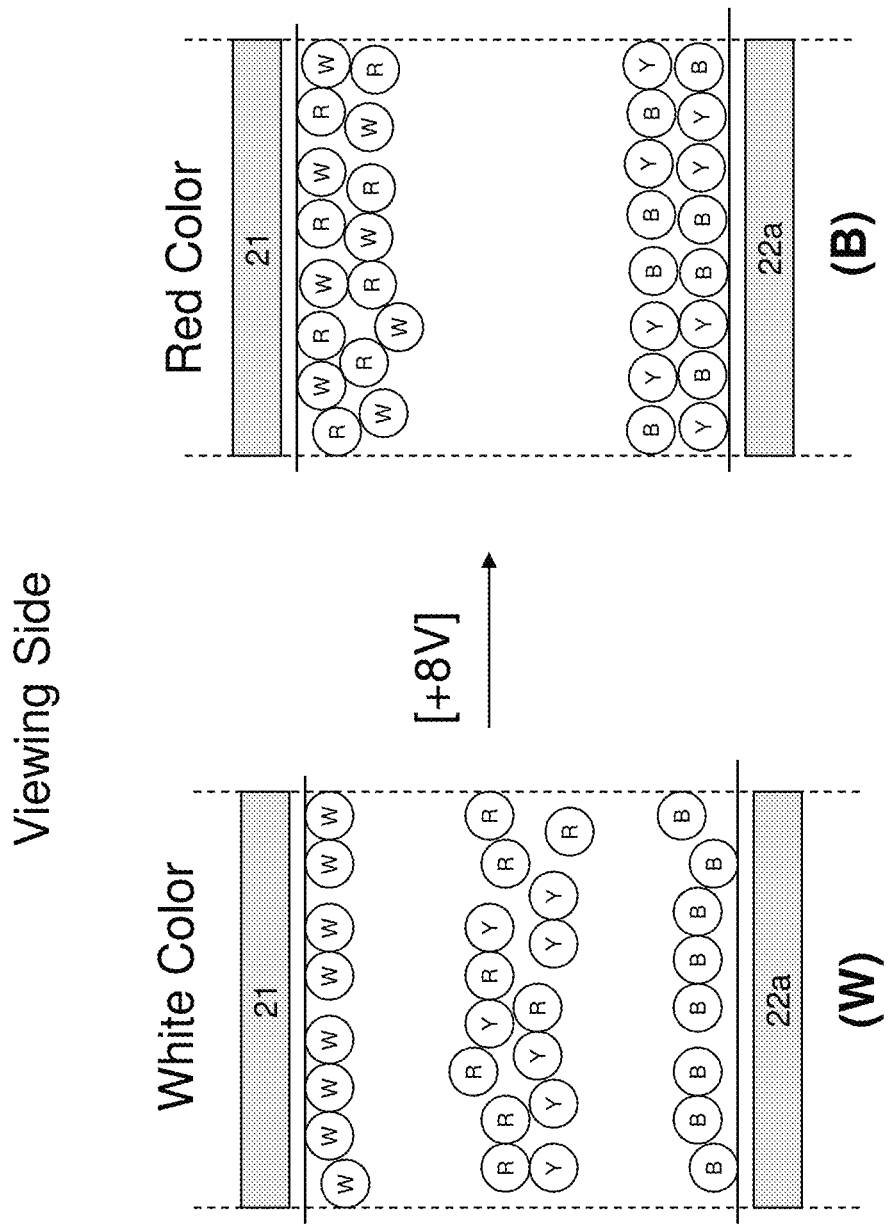

FIG. 6E shows a transition similar to that shown in FIG. 3E. As in FIG. 3E, the transition of FIG. 6E brings a mixture of the high positive particles and the white particles adjacent the common electrode, and since these high positive particles are now the light-transmissive red particles, a red optical state (R) is produced rather than the blue optical state of FIG. 3E.

Figure 6F:
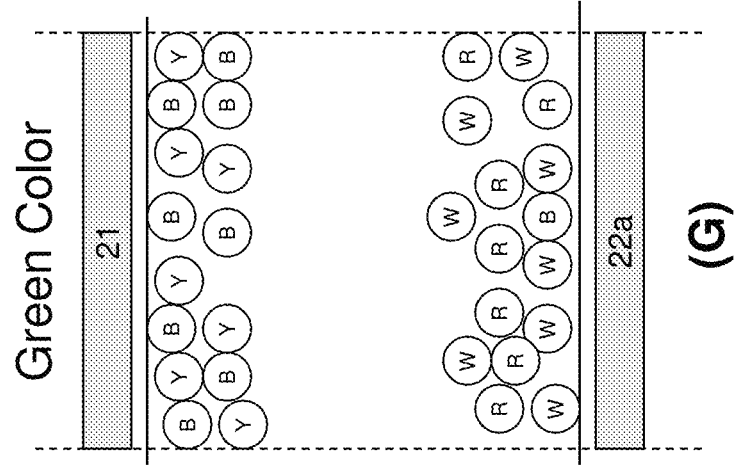
Figure 6F:
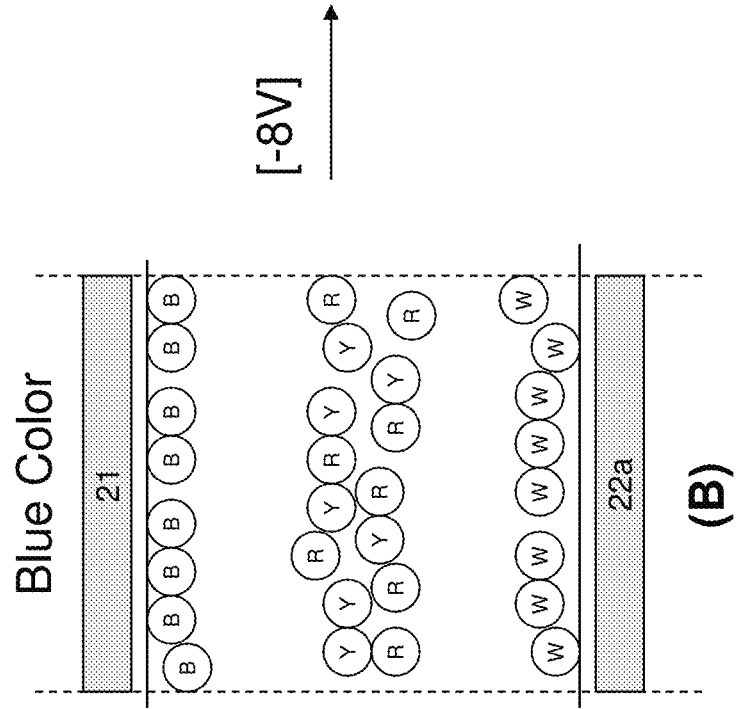

Finally, FIG. 6F shows a transition similar to that shown in FIG. 3F. The initial state is the state in which the low positive particles lie adjacent the common electrode, which in the medium of FIG. 6F is the blue optical state (B). Accordingly, the final state has a mixture of the low positive blue particles and the high negative yellow particles adjacent the common electrode, and hence a green optical state (G) is displayed.

Each of the waveforms described above with reference to FIGS. 5A-5F to effect the transitions of FIGS. 3A-3F respectively can also be used to effect the corresponding transitions of FIGS. 6A-6F respectively.

FIGS. 7A-7F are schematic cross-sections similar to those of FIGS. 3A-3F but showing various optical transitions which a five particle display device of the present invention can undergo. The electrophoretic medium shown in FIGS. 7A-7F is generally similar to that shown in FIGS. 3A-3F and thus comprises highly negatively charged yellow particles (Y), lowly charged negative white particles (W), and lowly charged positive red particles (R), and light-transmissive positively charged blue particles (B) having a zeta potential greater than that of the red particles. However, the blue particles are only the intermediate positive particles, since the electrophoretic medium shown in FIGS. 7A-7F further comprises highly charged positive green particles (G) having a zeta potential greater than that of the blue particles (B). The yellow, white and green particles are all light-reflecting.

The transition shown in FIG. 7A starts from a completely mixed state, denoted "(M)", produced by applying shaking pulses as described below. This transition is analogous to that shown in FIG. 3A, and applies alternating pulses of a high positive potential difference (e.g., +15 V) and no potential difference (0 V) to the pixel electrode 22a for a time period of sufficient length, thereby driving the green (G), blue (B) and red (R) particles towards the common electrode (21) or viewing side, and the yellow (Y) and white (W) particles towards the pixel electrode 22a side. Since the green particles more highly charged than the blue and red particles, the green particles lie immediately adjacent the common electrode with the blue and red particles immediately below them (as illustrated in FIG. 7A), thus causing the pixel to appear green, denoted "(G)" in FIG. 7A; the blue, red, white and yellow particles are all masked by the reflecting red particles and do not affect the displayed color.

The transition shown in FIG. 7B is exactly analogous to that shown in FIG. 3B; When alternating pulses of a high negative potential difference (e.g., −15 V) and no voltage (0 V) are applied to the pixel electrode 22a of a pixel in the completely mixed state (M), the yellow and white particles are driven towards the common electrode side and the red, blue and green particles towards the pixel electrode side. Since the yellow particles are more highly charged than the white particles, the reflective yellow particles lie immediately adjacent the common electrode, thus causing the pixel to appear yellow, denoted "(Y)" in FIG. 7B; the white, red, blue and green particles are all masked by the reflecting yellow particles and do not affect the displayed color.

Figure 7C:
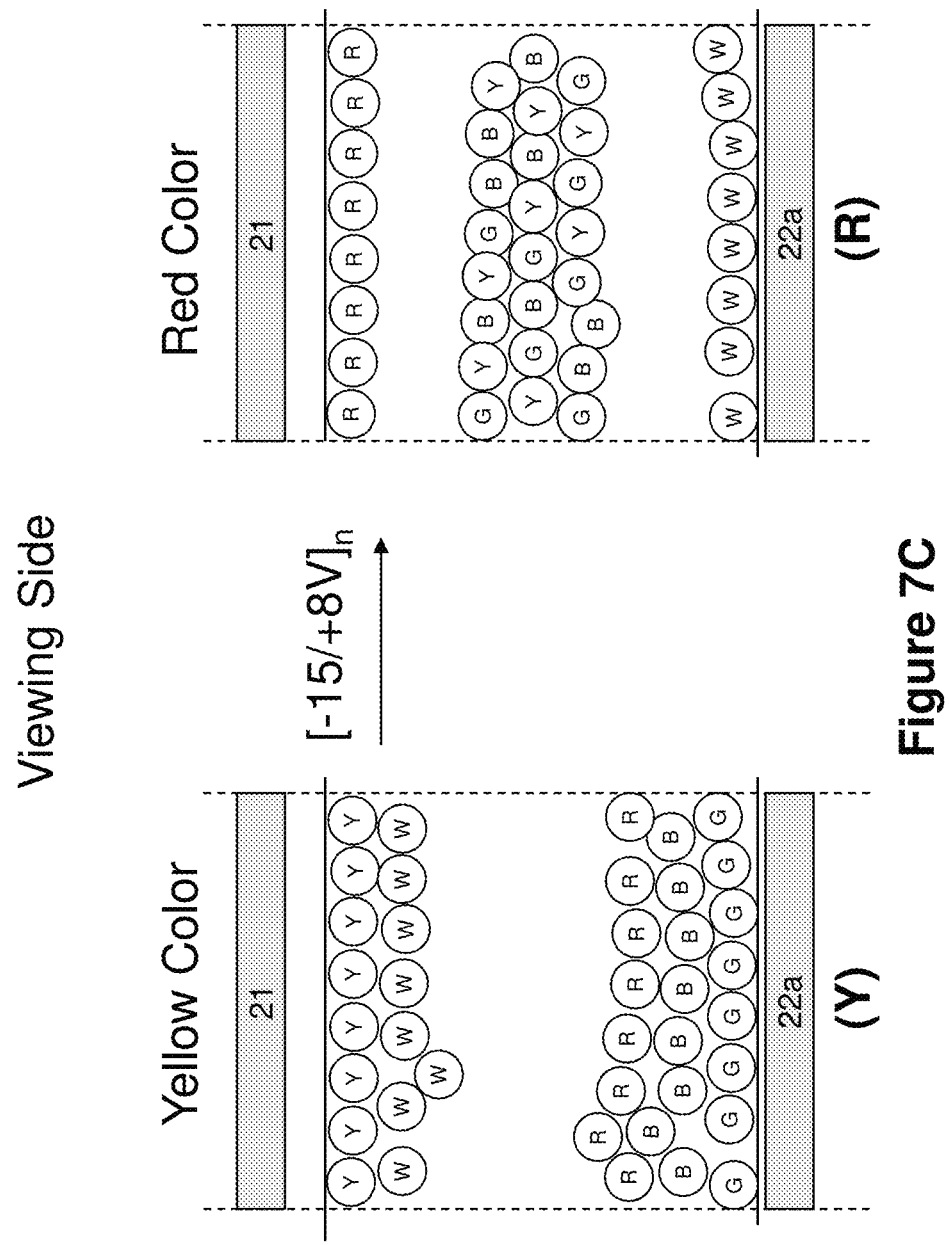

The transition shown in FIG. 7C starts from the yellow state (Y) shown in FIG. 7B. When alternating pulses of a high negative potential difference (e.g., −15 V) and a low positive potential difference (e.g., +8 V), with the low positive pulses being much longer than the high negative pulses, are applied to the pixel electrode 22a for a time period of sufficient length, the red (R) particles are driven towards the common electrode 21 side, and the white particles (W) are driven towards the pixel electrode 22a side. The effect of the oscillating electric field is to cause the highly charged green and yellow particles, and the intermediate charged blue particles, to pass each other repeatedly in the middle of the thickness of the electrophoretic layer, and the strong electrical attraction between these charged positive and negative particles greatly slows the movement of these particles and tends to keep them in the middle of the thickness of the electrophoretic layer. However, the electric field generated by the low positive pulses is sufficient to separate the low charged white and red particles, thereby allowing the low positive red particles (R) to move all the way to the common electrode 21 side and the low negative white particles to move to the pixel electrode 22a side. As a result, the reflective red particles lie immediately adjacent the common electrode, thus causing the pixel to appear red, denoted "(R)" in FIG. 7C; the white, yellow, blue and green particles are all masked by the reflecting red particles and do not affect the displayed color.

Figure 7D:
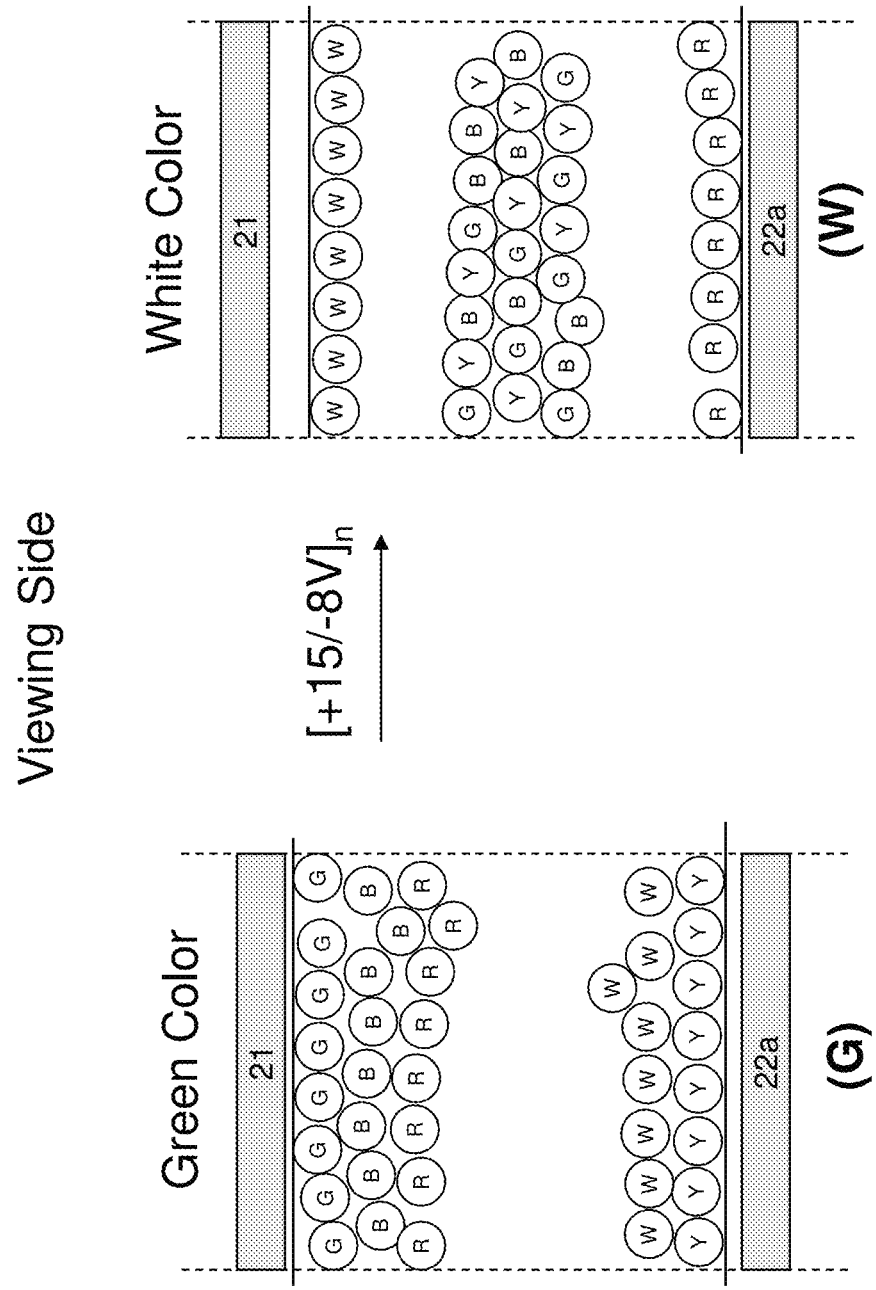

The transition shown in FIG. 7D starts from the green state (G) shown in FIG. 7A. When alternating pulses of a high positive potential difference (e.g., +15 V) and a low negative potential difference (e.g., −8 V), with the low negative pulses being much longer than the high positive pulses, are applied to the pixel electrode 22a for a time period of sufficient length, the red (R) particles are driven towards the pixel electrode 22a side, and the white particles (W) are driven towards the common electrode 21 side. As in the transition shown in FIG. 7C, the effect of the oscillating electric field is to cause the highly charged green and yellow particles, and the intermediate charged blue particles, to remain together in the middle of the thickness of the electrophoretic layer. However, the electric field generated by the low negative pulses is sufficient to separate the low charged white and red particles, thereby allowing the low positive red particles (R) to move all the way to the pixel electrode 22a side and the low negative white particles to move to the common electrode 21 side. As a result, the white particles lie immediately adjacent the common electrode, thus causing the pixel to appear white, denoted "(W)" in FIG. 7D; the red, yellow, blue and green particles are all masked by the white particles and do not affect the displayed color.

Figure 7E:
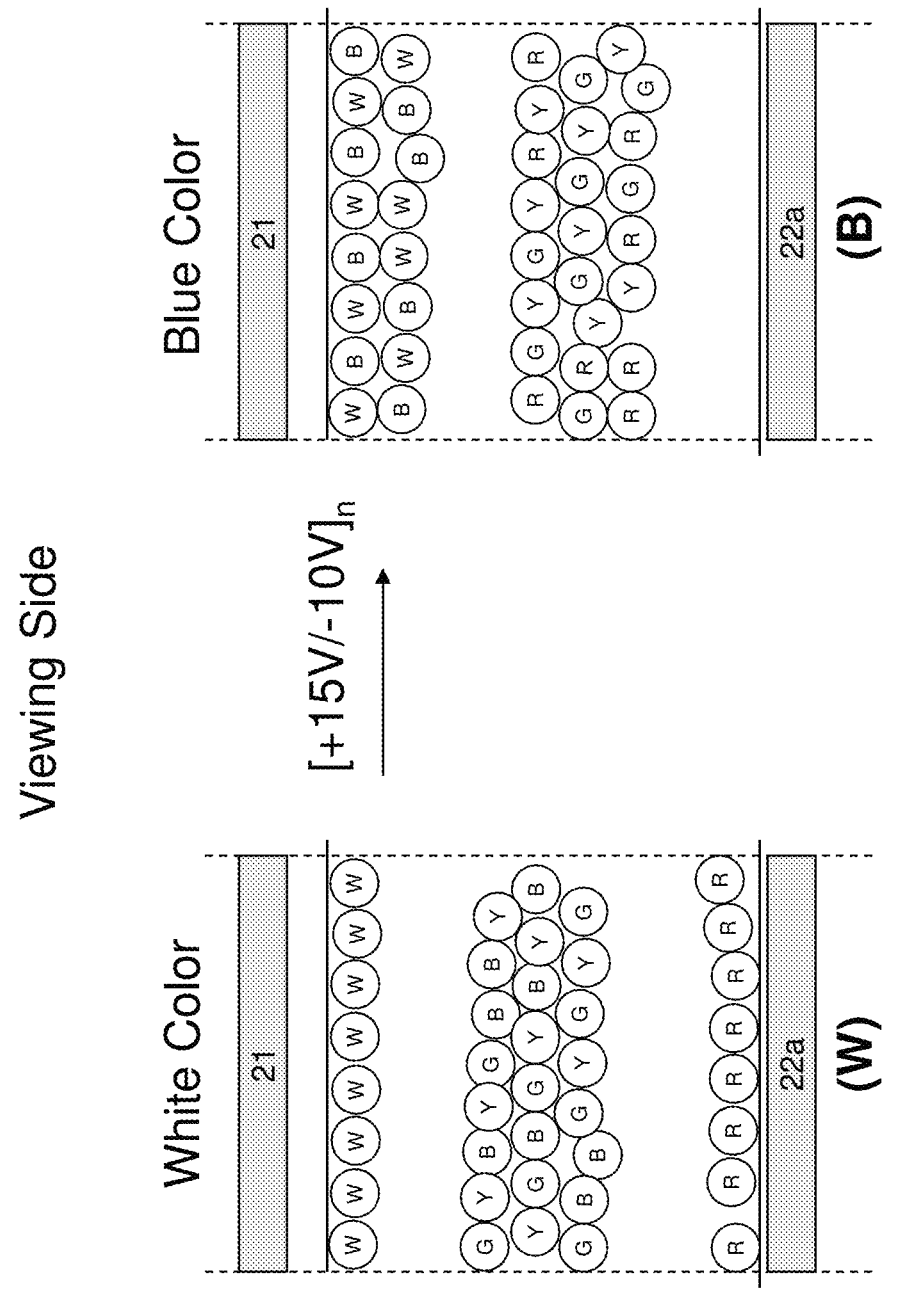

The transition shown in FIG. 7E starts from the white state (W) shown in FIG. 7D. When alternating pulses of a high positive potential difference (e.g., +15 V) and an intermediate negative potential difference (e.g., −10 V), with the negative pulses being much longer than the positive pulses, are applied to the pixel electrode 22a for a time period of sufficient length, the blue particles "escape" from the green/yellow/blue particle aggregate and gradually migrate towards the common electrode 21. The white particles similarly migrate in the opposite direction so that a mixture of the blue and white particles is formed adjacent the common electrode and a blue color, denoted "{B}" in FIG. 7E, is seen through the viewing surface. The red particles will migrate away from the pixel electrode; FIG. 7E illustrates the red particles being admixed with the yellow and green particles, but whether such an admixture is formed, or the red particles remain in a separate layer adjacent the pixel electrode, is irrelevant to the color displayed, since the blue and white particles adjacent the common electrode will mask the yellow, green and red particles. The remarks made above with regard to FIG. 3E regarding the saturation of the blue color, and the question of whether the blue and white particles are admixed or in discrete layers, also apply to the blue state illustrated in FIG. 7E.

Finally, the transition shown in FIG. 7F starts from the green state (G) shown in FIG. 7A. Application of an appropriate waveform (discussed below) causes the positively charged green, blue and red particles to move away from the common electrode 21. However, since the green particles are more strongly charged than the blue and red particles, the green particles move more quickly than the blue and red particles, thus leaving the blue and red particles adjacent the common electrode, either in discrete layers as illustrated in FIG. 7F, or as a mixed layer. In either case, a black state, denoted "(K)" in FIG. 7F is produced for reasons already discussed with reference to FIG. 3A. Since the red and blue particles mask the green, yellow and white particles, the exact positions of the green, yellow and white particles do not affect the visible color, but since both the white and the yellow particles will move away from the pixel electrode 22a, with the yellow particles moving more quickly than the white, the most probable state is that illustrated in FIG. 7F, with the green and yellow particles aggregated in the middle of the electrophoretic layer and the white particles adjacent the pixel electrode.

The transitions shown in FIGS. 7A and 7B can be effected using the waveforms shown in FIGS. 5A and 5B respectively. (It will be appreciated that some optimization of these waveforms may be required depending upon the exact electrophoretic mobilities of the particles used, the charges thereon and similar factors.) Similarly, the overall transition from the mixed state (M) to the yellow state (Y) shown in FIG. 7B, and thence to the red state (R) shown in FIG. 7C can be effected using the waveform shown in FIG. 5C. Also, the overall transition from the mixed state (M) to the green state (G) shown in FIG. 7A, and thence to the white state (W) shown in FIG. 7D can be effected using the waveform shown in FIG. 5D.

Figure 8A:
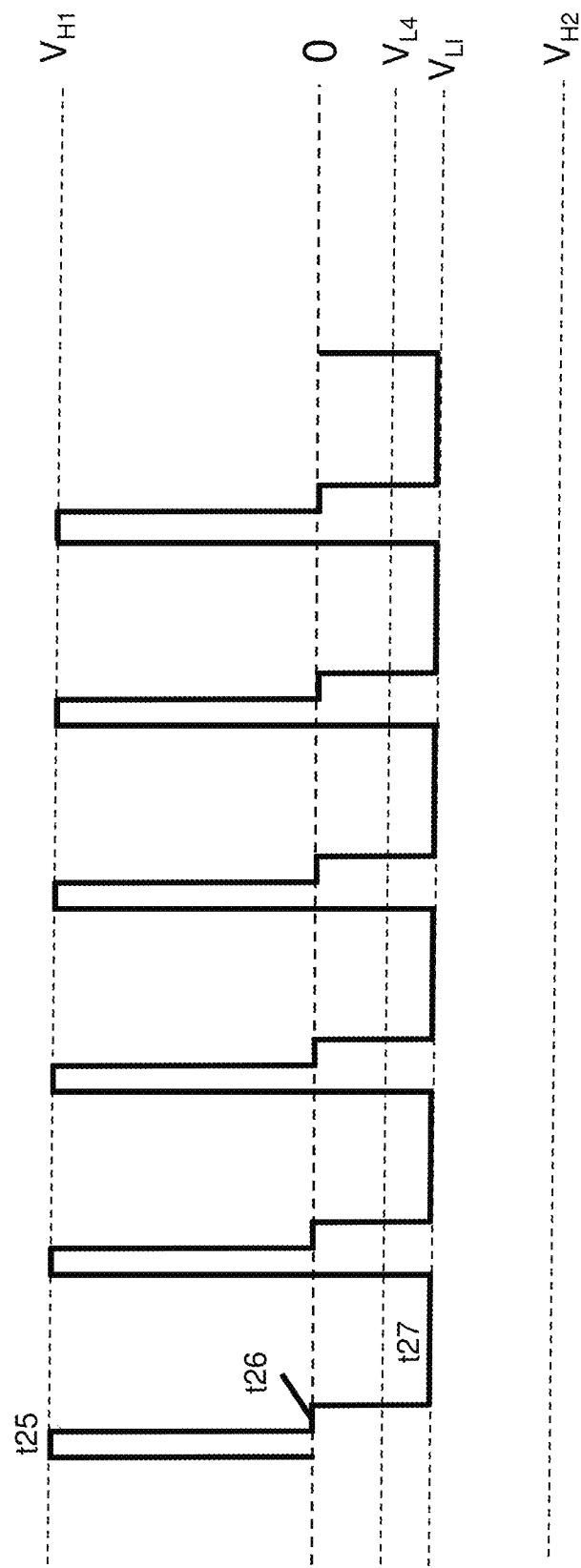
FIGS. 8A and 8B show waveforms that may be used to carry out the transitions shown FIGS. 7E and 7F respectively.

The white-to-blue transition shown in FIG. 7E may be effected using the waveform shown in FIG. 8A. This waveform comprises a short high positive pulse of voltage VH1 of duration t25, followed by a period of zero voltage of duration t26 and a period of intermediate negative voltage VLI of duration t27, where t27 is substantially greater than t25. This sequence is then repeated several times; five repetitions are illustrated in FIG. 8A but the number of repetitions can vary widely. It will be appreciated that to produce the blue state (B) starting from the mixed state (M), the waveform shown in FIG. 5D should be applied, followed by that shown in FIG. 8A.

The green-to-black transition shown in FIG. 7F may in many cases be effected by a single short high voltage negative pulse (or a short series of high voltage negative pulses separated by periods of zero voltage), which will suffice to move the green particles below the blue and red particles, thereby leaving a mixture of red and blue particles adjacent the common electrode and producing the desired black color. Thus, a black color can be produced from the mixed state (M) shown in FIG. 7A using the waveform of FIG. 3A followed by the one or more high voltage negative pulses. However, in some cases, depending upon the precise electrophoretic mobilities of the green, blue and red particles, use of such one or more high voltage negative pulses may tend to place the blue particles on average further away from the common electrode than the red particles, resulting in a color ranging from dark red to reddish black. If this problem occurs, the green-to-black transition of FIG. 7F may be effected using the waveform of FIG. 8B.

Figure 8B:
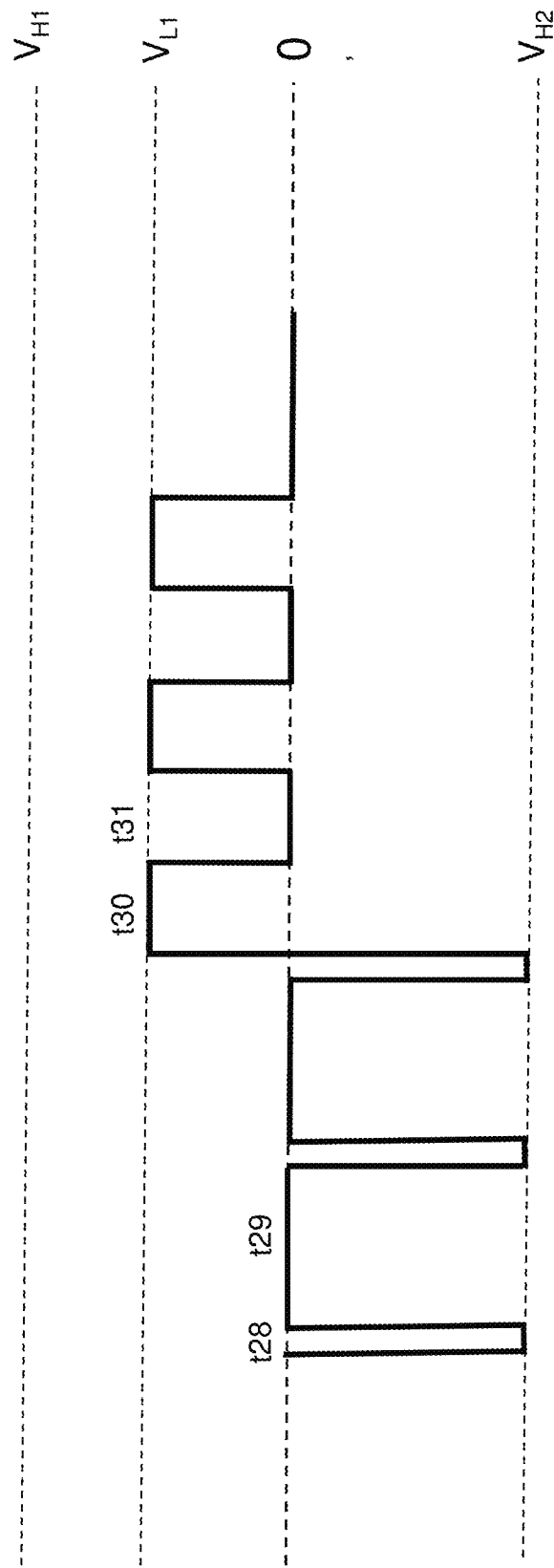

The waveform of FIG. 8B begins with a brief high negative pulse of duration t28 followed by a period of zero voltage of duration t29, where t29 is greater than t28. This sequence of high negative pulse and zero voltage is repeated and is followed by a third high negative pulse of duration t28; a larger or smaller number of pulses may of course be used if necessary. By comparing FIG. 8B with FIG. 5A, it will be seen that the effect of the three negative pulses is to partially reverse the driving of the green particles to the common electrode and the yellow particles to the pixel electrode, thereby placing both the green and yellow particles near the middle of the electrophoretic layer, where they can aggregate as previously described. The second part of the waveform shown in FIG. 8B comprises three intermediate voltage positive pulses each of duration t30 separated by periods of zero voltage of duration t31, where t30 is greater than t28. The durations t28 and t30 and the driving voltage applied are chosen so that the impulse applied by the positive pulses is substantially equal in magnitude but opposite in polarity to that applied by the negative pulses. The positive pulses cause substantially no change in the positions of the yellow and green particles, since the intermediate voltage employed is insufficient to break up the green/yellow aggregates, but these positive pulses do substantially restore the red, blue and white particles to the positions they occupied prior to the application of the waveform of FIG. 8B, thus producing the final particle positions shown at (K) in FIG. 7F.

From the foregoing, it will be seen that the present invention can provide a four particle electrophoretic medium which can generate at least five, and in some cases, six useful colors using only four different types of particles. The five particle electrophoretic medium of the invention can generate at least six useful colors. It should be noted that in practice (for example) the green color produced by the five particle system shown in FIG. 7A is more consistent than the green color produced by the four particle system shown in FIG. 6F, since the former is the natural color of a pigment particle whereas the latter may vary somewhat depending upon the exact positions of the blue and yellow particles, which may be difficult to maintain precisely over the working lifetime of a display.

The electrophoretic media and devices of the present invention may make of use of any of the particles, fluids, encapsulation materials and electrophoretic device designs described in the prior art, as set out for example in the following:

(a) Electrophoretic particles, fluids and fluid additives; U.S. Pat. Nos. 7,002,728 and 7,679,814;

(b) Capsules, binders and encapsulation processes; U.S. Pat. Nos. 6,922,276 and 7,411,719;

(c) Microcell structures, wall materials, and methods of forming microcells; U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,826,129; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; 9,238,340; 9,470,950; 9,554,495; 9,563,099; 9,733,540; 9,778,536; 9,835,925; 10,444,591; and 10,466,564; and U.S. Patent Applications Publication Nos. 2007/0237962; 2009/0168067; and 2011/0164301;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; 9,423,666; 9,436,056; 9,459,510; 9,513,527; 9,541,814; 9,552,780; 9,640,119; 9,646,547; 9,671,668; 9,697,778; 9,726,959; 9,740,076; 9,759,981; 9,761,181; 9,778,538; 9,779,670; 9,779,671; 9,812,073; 9,829,764; 9,921,451; 9,922,603; 9,989,829; 10,032,419; 10,036,929; 10,036,931; 10,332,435; 10,339,876; 10,353,266; 10,366,647; 10,372,010; 10,380,931; 10,380,955; 10,431,168; 10,444,592; 10,467,984; 10,475,399; 10,509,293; and 10,514,583; and U.S. Patent Applications Publication Nos. 2008/0043318; 2008/0048970; 2009/0225398;

2010/0156780; 2011/0043543; 2012/0326957; 2013/0242378; 2013/0278995; 2014/0055840; 2014/0078576; 2015/0103394; 2015/0118390; 2015/0124345; 2015/0268531; 2015/0301246; 2016/0026062; 2016/0048054; and 2016/0116818;

(h) Methods for driving displays; see for example U.S. Pat. Nos. 7,012,600 and 7,453,445; and (i) Applications of displays; see for example U.S. Pat. Nos. 7,312,784 and 8,009,348.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display.

The manufacture of a three-layer electrophoretic display normally involves at least one lamination operation. For example, in several of the aforementioned patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

As discussed in the aforementioned U.S. Pat. No. 6,982,178, (see column 3, line 63 to column 5, line 46) many of the components used in electrophoretic displays, and the methods used to manufacture such displays, are derived from technology used in liquid crystal displays (LCD's). For example, electrophoretic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with encapsulated electrophoretic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to encapsulated electrophoretic displays. Because the electrophoretic material is typically solid (i.e., has solid outer surfaces), it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electrophoretic medium sandwiched between two adhesive layers, one or both of the adhesive layers being covered by a release sheet. Another form of the double release sheet comprises a layer of a solid electrophoretic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electrophoretic medium; and a release sheet. This inverted front plane laminate is used to form an electro-optic display having a layer of lamination adhesive between the electrophoretic layer and the front electrode or front substrate; a second, typically thin layer of adhesive may or may not be present between the electrophoretic layer and a backplane. Such electro-optic displays can combine good resolution with good low temperature performance.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of driving an electrophoretic display, the electrophoretic display comprising a layer of an electrophoretic medium having a viewing surface on one side thereof and a second surface on an opposite side thereof, the electrophoretic display further comprising voltage control means for applying an electric field through the layer of electrophoretic medium, the electrophoretic medium comprising a fluid and first, second, third, and fourth types of particles dispersed in the fluid, the first, second, third, and fourth types of particles being respectively partially light-transmissive red, reflective yellow, reflective blue, and white, the first and third types of particles having charges of one polarity and the second and fourth types of particles having charges of the opposite polarity, the first type of particles having a greater zeta potential or electrophoretic mobility than the third type of particles, and the second type of particles having a greater zeta potential or electrophoretic mobility than the fourth type of particles, the method comprising:

(i) applying a DC balancing pulse of a first driving voltage and a first polarity to the electrophoretic medium;
(ii) after step (i), applying a shaking voltage pulse to the electrophoretic medium to achieve a mixed color state in which all four types of particles are randomly distributed in the fluid;
(iii) after step (ii), applying zero voltage to the electrophoretic medium for a first period of time;
(iv) after step (iii), applying a second driving voltage having a same magnitude as the first driving voltage and an opposite polarity of the first polarity to the electrophoretic medium for a second period of time;
(v) after step (iv), applying zero voltage to the electrophoretic medium for a third period of time, the third period of time being longer than the second period of time; and
(vi) repeating steps (iv) and (v) a plurality of times, thereby causing a process black color to be displayed at the viewing surface.

2. The method of claim 1, wherein the plurality of times comprises at least four times.

3. A method of driving an electrophoretic display, the electrophoretic display comprising a layer of an electrophoretic medium having a viewing surface on one side thereof and a second surface on an opposite side thereof, the electrophoretic display further comprising voltage control means for applying an electric field through the layer of electrophoretic medium, the electrophoretic medium comprising a fluid and first, second, third, and fourth types of particles dispersed in the fluid, the first, second, third, and fourth types of particles being respectively partially light-transmissive red, reflective yellow, reflective blue, and white, the first and third types of particles having charges of one polarity and the second and fourth types of particles having charges of the opposite polarity, the first type of particles having a greater zeta potential or electrophoretic mobility than the third type of particles, and the second type of particles having a greater zeta potential or electrophoretic mobility than the fourth type of particles, the method comprising:

(i) driving the electrophoretic medium to display a white color at the viewing surface;
(ii) after step (i), applying a first driving voltage to the electrophoretic medium for a first period of time, the first driving voltage having a polarity driving the first and third particles towards the viewing surface;
(iii) after step (ii), applying zero voltage to the electrophoretic medium for a second period of time;
(iv) after step (iii), applying a second driving voltage to the electrophoretic medium for a third period of time, the second driving voltage having a polarity opposite to, and a magnitude less than the first driving voltage, and the third period of time being longer than the first period of time; and
(v) repeating steps (ii) to (iv) a plurality to times, thereby causing the color red to be displayed at the viewing surface.

4. The method of claim 3, wherein the plurality to times comprises at least four times.

* * * * *